US006831706B2

(12) United States Patent
Abe et al.

(10) Patent No.: US 6,831,706 B2
(45) Date of Patent: Dec. 14, 2004

(54) PROJECTION IMAGE DISPLAY APPARATUS

(75) Inventors: Masayuki Abe, Tochigi (JP); Keiji Ohtaka, Kanagawa (JP); Atsushi Okuyama, Saitama (JP)

(73) Assignee: Canon Kabushiki Kiasha (JP)

( * ) Notice: Subject to any disclaimer, the term of this patent is extended or adjusted under 35 U.S.C. 154(b) by 0 days.

(21) Appl. No.: 10/197,131

(22) Filed: Jul. 17, 2002

(65) Prior Publication Data

US 2003/0117593 A1 Jun. 26, 2003

(30) Foreign Application Priority Data

Jul. 19, 2001 (JP) ........................................ 2001-220730

(51) Int. Cl.$^7$ ........................ G02F 1/1335; G03B 21/14
(52) U.S. Cl. .............................. 349/8; 353/31; 353/20; 349/9
(58) Field of Search ..................... 349/9, 5, 8; 353/31, 353/32, 20, 8; 359/495

(56) References Cited

U.S. PATENT DOCUMENTS

| | | | | |
|---|---|---|---|---|
| 4,913,529 | A | * 4/1990 | Goldenberg et al. | ........... 349/9 |
| 5,716,122 | A | * 2/1998 | Esaki et al. | ............ 353/33 |
| 5,729,306 | A | * 3/1998 | Miyake et al. | ............ 349/9 |
| 5,808,795 | A | 9/1998 | Shimomura et al. | ....... 359/488 |
| 6,132,047 | A | * 10/2000 | Itoh | ............ 353/20 |
| 6,183,091 | B1 | 2/2001 | Johnson et al. | ............ 353/20 |
| 6,419,362 | B1 | 7/2002 | Ikeda et al. | ............ 353/20 |

FOREIGN PATENT DOCUMENTS

| | | |
|---|---|---|
| JP | 2000-284228 | 10/2000 |
| WO | WO 97/24637 | 7/1997 |

OTHER PUBLICATIONS

European Patent Abstract (English) of Japanese Publication No. 2000-284228, Publication Date Oct. 13, 2000.
European Patent Office Search Report dated Jan. 7, 2004.

* cited by examiner

Primary Examiner—Toan Ton
(74) Attorney, Agent, or Firm—Morgan & Finnegan, LLP

(57) ABSTRACT

When light from a reflection image display element is incident on a polarization split surface at an angle other than 45°, leakage light that decreases the contrast of an image is produced. In a projection image display apparatus which illuminates an image display element with light from a light source and projects light from the image display element through two polarization split surfaces, when the angles of first and second light rays, of light rays incident on the polarization split surface, with respect to the optical axis correspond to 55% of the maximum angle of the incident light rays with respect to the optical axis, where light rays of which incident angle with respect to said image display element is larger is set as first light ray and light rays of which incident angle with respect to said image display element is smaller is set as second light ray, and a light shielding characteristic value L on the two polarization split surfaces is represented by $L=[(M1)a \cdot (M1)b + (M2)a \cdot (M2)b]/2$ where $(M1)a$ is the amount of leakage light of the first light ray on the polarization split on the reflection image display element side, $(M2)a$ is the amount of leakage light of the second light ray, $(M1)b$ is the amount of leakage light of the first light ray on the polarization split on the projection optical system side, and $(M2)b$ is the amount of leakage light of the second light ray.

35 Claims, 17 Drawing Sheets

PROJECTION IMAGE DISPLAY APPARATUS

BACKGROUND OF THE INVENTION

1. Field of the Invention

The present invention relates to a projection image display apparatus using an image display element.

2. Related Background Art

A reflection image display element such as a reflection LCD panel reflects incident illumination light and forms image light by performing modulation in accordance with an image signal. For example, Japanese Patent Application Laid-Open No. 2000-284228 discloses a projection image display apparatus which performs color separation/synthesis and projecting an image by using such a reflection image display element, a color selective retardation plate for rot 90° the polarization direction of only light in a given wavelength region, and a polarizing beam splitter having a polarization split surface having the properties of reflecting S-polarized light and transmitting P-polarized light.

FIG. 15 shows an arrangement of a conventional projection image display apparatus. This apparatus includes a light source 101, polarizing plate 102, color selective retardation plates 103, 104, and 105, polarizing beam splitters 106, 107, 108 and 109, reflection liquid crystal display elements 110R, 111B, and 112G, and projection lens 113.

The unpolarized light emitted from the light source 101 is converted into linearly polarized light (P-polarized light) by the polarizing plate 102, and the polarization direction of only red (R) light is rotated by 90° by the color selective retardation plate 103 to convert the red light into S-polarized light. The red light which is S-polarized light is incident on the polarizing beam splitter 106 and reflected, and green (G) light and blue (B) light, other than the red light, which are P-polarized light, are transmitted through the polarizing beam splitter 106. With this operation, the unpolarized light is color-separated into red light, and green light and blue light.

The red light is reflected by the polarizing beam splitter 108 and incident on the reflection liquid crystal display element 110R. The green light and blue light are incident on the polarizing beam splitter 104, by which the polarization direction of only the blue light is rotated by 90° to convert the light into S-polarized light.

The polarizing beam splitter 107 reflects the blue light which is S-polarized light and transmits the green light which is P-polarized light, thereby color-separating these light components. The blue light and green light are then incident on the reflection liquid crystal display elements 111B and 112G, respectively.

Of the red light modulated by the reflection liquid crystal display element 110R, the S-polarized light component is reflected by the polarizing beam splitter 108 and returns to the light source 101 side, and the P-polarized light component is transmitted through the polarizing beam splitter 108 to become projection light.

Of the light modulated by the reflection liquid crystal display element 111B, the S-polarized light component is reflected by the polarizing beam splitter 107 and returns to the light source 101 side, and the P-polarized light component is transmitted through the polarizing beam splitter 107 to become projection light.

Of the light modulated by the reflection liquid crystal display element 112G, the P-polarized light is transmitted through the polarizing beam splitter 107 and returns to the light source 101 side, and the S-polarized light is reflected by the polarizing beam splitter 107 to become projection light.

The blue light and green light both comprising projection light are incident on the color selective retardation plate 105, by which the polarization direction of the blue light is rotated by 90°, thereby uniformly converting both the blue light and the green light into S-polarized light.

The blue light and green light which have become S-polarized light are reflected by the polarizing beam splitter 109, whereas the red light which is P-polarized light is transmitted through the polarizing beam splitter 109. With this operation, the red light, green light, and blue light are synthesized into one light. This light is then projected through the projection lens 113 to display a color image.

In general, a polarizing beam splitter (i.e., a polarization split surface) exhibits ideal polarization split performance as shown in FIG. 16 with respect to light incident on this polarization split surface at 45°, but exhibits imperfect characteristics as shown in FIG. 17 with respect to light incident at angles deviating from 45°.

This is because since an optical thin film forming a polarization split surface acts on optical performance at $n \cdot d \cos\theta$ where n is the refractive index of the thin film, d is the thickness of the thin film, and $\theta$ is the incident angle of light, the optical performance changes in accordance with a change in the incident angle $\theta$.

As shown in FIG. 2, as an illumination system for a projection image display apparatus, an illumination system designed to uniformly illuminate the reflection image display element is widely used.

The light emitted from a light source 1 is incident on a point on a reflection liquid crystal display element R with a divergent angle $2\omega$ through a condenser lens system 5 and field lens system 7. For this reason, light is incident on the polarization split surface in the range from $(45-\omega)°$ to $(45+\omega)°$. Therefore, light incident on the polarization split surface at an angle deviating from 45° is not perfectly separated into a P-polarized light component and S-polarized light component.

In this case, since the polarization direction of light reflected by a reflection liquid crystal display element ready to display black is the same as that of light incident on the reflection image display element, the light reflected by the reflection image display element must be returned to the light source side through the polarizing beam splitter and detected by the polarizing beam splitter.

However, since the light reflected by the reflection image display element ready to display black is incident on the polarizing beam splitter with a spread corresponding to the incident angle $2\omega$, light incident at an angle deviating from 45° is not detected by the polarizing beam splitter and becomes so-called leakage light, which is projected through the projection lens. As the amount of leakage light increases, displayed black appears as if it was floating, and the contrast of an image may decrease.

SUMMARY OF THE INVENTION

For preventing above situation, one aspect of the present invention is to provide a projection image display apparatus comprising an illumination optical system which illuminates an image display element with light from a light source and a projection optical system which projects light from the image display element through two polarization split surfaces, wherein when an occurrence ratio of leakage light on one polarization split surface with respect to a light ray having a wavelength λ is represented by analysis performance K(λ), relative visibility of the human eye is represented by Y(λ), and a wavelength region of light rays incident on the one polarization split surface is represented by a range of $\lambda_1$ to $\lambda_2$, a value M given by $$M = \int_{\lambda_1}^{\lambda_2} Y(\lambda)K(\lambda)d\lambda \bigg/ \int_{\lambda_1}^{\lambda_2} Y(\lambda)d\lambda$$

is set as a leakage light amount on the polarization split surface, of the light rays incident on one of the two polarization split surfaces which is located on the image display element side whose angles with respect to an optical axis correspond to 55% of a maximum angle of the incident light rays with respect to the optical axis, light lays of which incident angle with respect to said image display element is larger is set as first light ray and light rays of which incident angle with respect to said image display element is smaller is set as second light ray, respectively, and $$L < 0.006 \tag{1}$$

is satisfied when a light shielding characteristic value L on the two polarization split surfaces is represented by $$L = [(M1)a \cdot (M1)b + (M2)a \cdot (M2)b]/2$$

where (M1)a is the amount of leakage light of the first light ray on the polarization split surface on the image display element side, (M2)a is the amount of leakage light of the second light ray on the polarization split surface on the image display element side, (M1)b is the amount of leakage light of the first light ray on the polarization split surface on the projection optical system side, and (M2)b is the amount of leakage light of the second light ray on the polarization split surface on the projection optical system side.

In this case, as relative visibility of the human eye, for example, a value defined by international standards may be used.

In addition, leakage light is light, of a first polarized light component, which is transmitted through a polarization split surface that reflects light having a first polarized light component and transmits light having a second polarized light component perpendicular to the first polarized light component, or light, of the second polarized light component, which is reflected by the polarization split surface. Furthermore, leakage light is light, of the first polarized light component, which is reflected by a polarization split surface that transmits light having the first polarized light component and reflects light having the second polarized light component perpendicular to the first polarized light component or light, of the second polarized light component, which is transmitted through the polarization split surface.

The above "light ray, of the light rays incident on the polarization split surface, whose angles with respect to the optical axis correspond to 55% of the maximum angle of the incident light rays with respect to the optical axis" and "first and second light rays" will be described with reference to FIG. 18.

Referring to FIG. 18, an optical system has an optical axis Lo, and a polarization split surface F is formed on a polarizing beam splitter G on the image display element side.

A total light beam (solid lines) incident on the polarization split surface F has a divergent angle β with respect to the optical axis Lo (2β centered on the optical axis). In addition, a light beam (dotted lines) having a divergent angle β' (2β' centered on the optical axis) corresponding to 55% of the angle β with respect to the optical axis Lo produces an illumination light amount about ½ that by the total incident light beam on the polarization split surface F.

In the present invention, therefore, of light rays L1 and L2 having the angle β' with respect to the optical axis Lo, the light ray L1 which is incident on the polarization split surface at a larger angle (α+) is defined as the "first light ray" (so-called an upper light ray on an optical cross-section), and the light ray L2 incident at a smaller angle (α−) is defined as the "second light ray" (so-called a lower light ray).

In the above apparatus, the light shielding characteristic value L preferably satisfies $$L < 0.002 \tag{2}$$

In the above apparatus, the image display element is preferably a reflection image display element.

The above apparatus preferably comprises: first, second, and third reflection image display elements; a light beam splitting system which splits light from the light source into a plurality of light beams and substantially uniforms intensities of the light beams; a color separation system which separates light from the light beam splitting system into a first wavelength region light and second and third wavelength region lights; a first polarization split surface which guides the first wavelength region light from the color separation system to said first reflection image display element and analyzes light from the first reflection image display element; a first color selective retardation plate which changes a polarization direction of only the second wavelength region light of the second and third wavelength region light from the color separation system; a second polarization split surface which splits the second and third wavelength region light from the first color selective retardation plate, which have polarization directions perpendicular to each other to guide the lights to the second and third reflection image display elements, respectively, synthesizes lights from the second and third reflection image display elements, and analyzes lights from the second and third reflection image display elements; a second color selective retardation plate which changes a polarization direction of only one of the second and third wavelength region lights from the second polarization split surface; and a third polarization split surface which synthesizes the second and third wavelength region lights from the second color selective retardation plate and the first wavelength region light from the first polarization split surface, guides the light components to the projection optical system, and analyzes light components from the first, second, and third reflection image display elements.

In the above apparatus, the apparatus comprises first, second, and third reflection image display elements, and the illumination optical system splits light from the light source into first, second, and third wavelength region lights, and guides the lights to the first, second, and third reflection image display elements, respectively.

In the above apparatus, light reflected by one of said first, second, and third reflection image display elements is reflected by the polarization split surface located on the reflection image display element side, is transmitted through the polarization split surface located on the projection optical system side, and reaches the projection optical system, analysis performance Ka(λ) of the polarization split surface on the reflection image display element side is represented by $$Ka(\lambda)=1-Tpa(\lambda)$$

where Tpa(λ) is a transmittance of P-polarized light through the polarization split surface on the reflection image display element side, analysis performance Kb(λ) of the polarization split surface on the projection optical system side is represented by $$Kb(\lambda)=Tsb(\lambda)$$

where Tsb(λ) is a transmittance of S-polarized light through the polarization split surface on the projection optical system side, and analysis performance K(λ) of the two polarization split surfaces is represented by $$K(\lambda) = Ka(\lambda) \cdot Kb(\lambda)$$
$$= (1 - Tpa(\lambda)) \cdot Tsb(\lambda).$$

In the above apparatus, light transmitted through the polarization split surface on one of the first, second, and third reflection image display element sides is reflected by the polarization split surface on the projection optical system side and reaches the projection optical system, analysis performance Ka(λ) of the polarization split surface is represented by $$Ka(\lambda)=Tsa(\lambda)$$

where Tsa(λ) is a transmittance of S-polarized light through the polarization split surface on the reflection image display element side, analysis performance Kb(λ) of the polarization split surface is represented by $$Kb(\lambda)=1-Tpb(\lambda)$$

where Tpb(λ) is a transmittance of P-polarized light through the polarization split surface on the projection optical system side, and analysis performance K(λ) of the two polarization split surfaces is represented by $$K(\lambda) = Ka(\lambda) \cdot Kb(\lambda)$$
$$= Tsa(\lambda) \cdot (1 - Tpb(\lambda)).$$

In the above apparatus, light transmitted through the polarization split surface on one of the first, second, and third reflection image display element sides is transmitted through the polarization split surface on the projection optical system side and reaches the projection optical system, analysis performance Ka(λ) of the polarization split surface is represented by $$Ka(\lambda)=Tsa(\lambda)$$

where Tsa(λ) is a transmittance of S-polarized light through the polarization split surface on the reflection image display element side, analysis performance Kb(λ) of the polarization split surface is represented by $$Kb(\lambda)=Tsb(\lambda)$$

where Tsb(λ) is a transmittance of S-polarized light through the polarization split surface on the projection optical system side, and analysis performance K(λ) of the two polarization split surfaces is represented by $$K(\lambda) = Ka(\lambda) \cdot Kb(\lambda)$$
$$= Tsa(\lambda) \cdot Tsb(\lambda).$$

In the above apparatus, light reflected by the polarization split surface on one of the first, second, and third reflection image display element sides is reflected by the polarization split surface on the projection optical system side and reaches the projection optical system, analysis performance Ka(λ) of the polarization split surface is represented by $$Ka(\lambda)=1-Tpa(\lambda)$$

where Tpa(λ) is a transmittance of P-polarized light through the polarization split surface on the reflection image display element side, analysis performance Kb(λ) of the polarization split surface is represented by $$K2(\lambda)=1-Tpb(\lambda)$$

where Tpb(λ) is a transmittance of P-polarized light through the polarization split surface on the projection optical system side, and analysis performance K(λ) of the two polarization split surfaces is represented by $$K(\lambda) = Ka(\lambda) \cdot Kb(\lambda)$$
$$= (1 - Tpa(\lambda)) \cdot (1 - Tpb(\lambda)).$$

In calculating leakage light amounts, if wavelength regions subjected to integration are defined such that the blue wavelength region is defined by 430 to 490 nm; the green wavelength region, 500 to 580 nm; and the red wavelength region, 590 to 650 nm, contrast values on the R, G, and B optical paths can be properly estimated.

In the above apparatus, the image display element is preferably a reflection liquid crystal display element.

The above apparatus preferably comprises three polarizing beam splitters and one dichroic prism.

The above apparatus preferably comprises three polarizing beam splitters and one dichroic mirror.

In the above apparatus, each of the first, second, and third wavelength region light components preferably corresponds to one of red, green, and blue light components.

DETAILED DESCRIPTION OF THE PREFERRED EMBODIMENTS

First Embodiment

Figure 1:
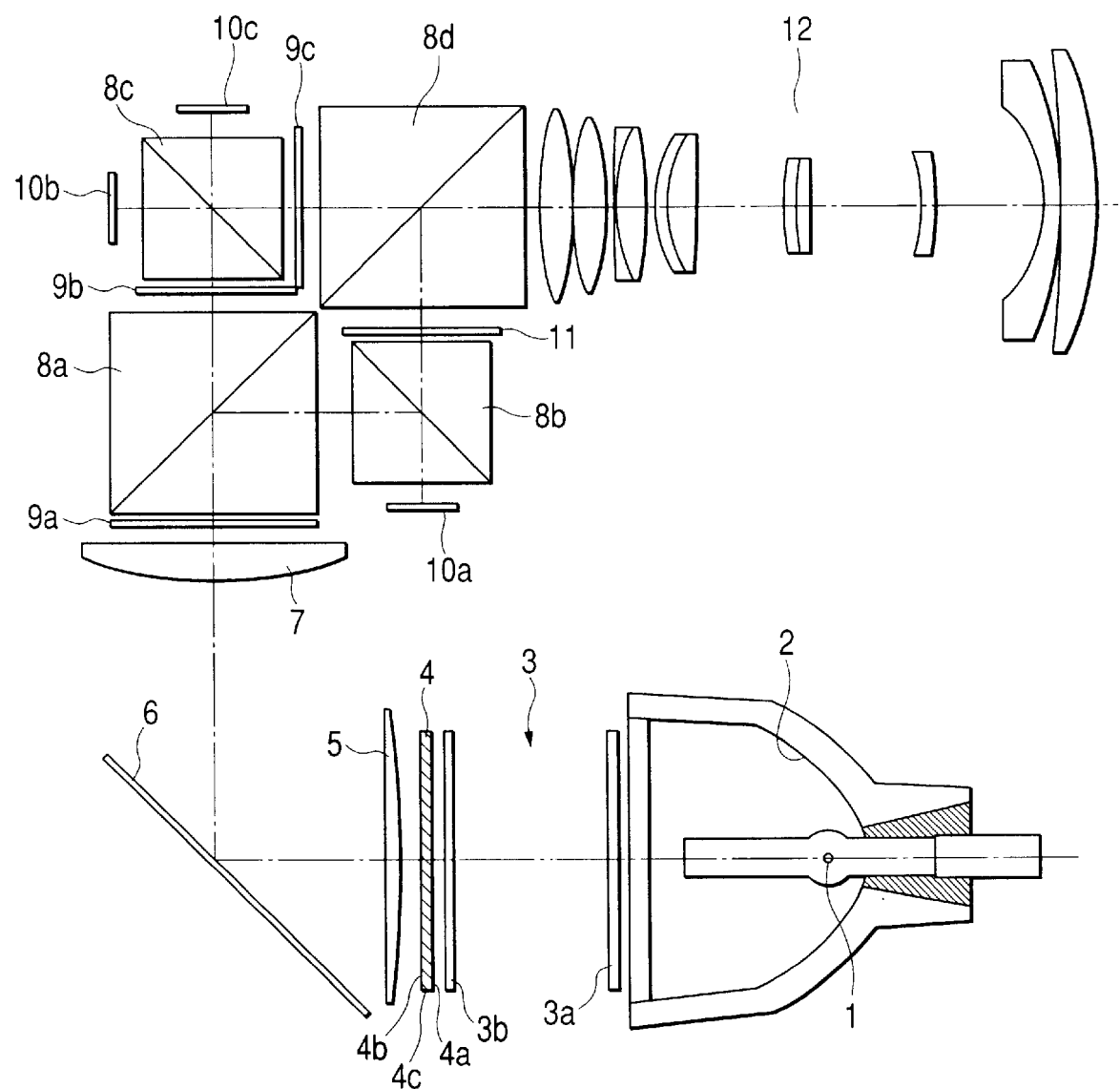
FIG. 1 is a view showing the optical arrangement of a projection image display apparatus according to the first embodiment of the present invention.

FIG. 1 shows the optical arrangement of a projection image display apparatus according to the first embodiment of the present invention. Referring to FIG. 1, a reflector 2 is used to radiate light from a light source 1 formed from a high-pressure mercury-vapor lamp or the like in a predetermined direction.

An integrator 3 forms an illumination area having substantially uniform illumination intensity and is constituted by fly-eye lenses 3a and 3b.

A polarization conversion element 4 uniformly polarizes unpolarized light in a predetermined polarization direction and is constituted by a polarization split film 4a, reflecting film 4b, and λ/2 retardation plate 4c.

A condenser lens 5 focuses illumination light. A mirror 6 guides an optical path to a polarizing beam splitter (to be described later) or the like. This apparatus also includes a field lens 7.

Each of polarizing beam splitters 8a, 8b, 8c, and 8d has a polarization split film (polarization split surface) for transmitting P-polarized light and reflecting S-polarized light. Each of color selective retardation plates 9a, 9b, and 9c changes (rotates) the polarization direction of light in a predetermined wavelength region by 90°.

Reflection liquid crystal display elements 10a, 10b, and 10c display R, G, and B images, respectively. This apparatus also includes a λ/2 retardation plate 11 and projection lens system 12.

The optical function of the above arrangement will be described next. The light emitted from the light source 1 is focused in the direction of the fly-eye lens 3a by the reflector 2. This light beam is divided into a plurality of light beams by the fly-eye lens 3a. The plurality of light beams are superimposed on the reflection liquid crystal display elements 10a, 10b, and 10c owing to the functions of the fly-eye lens 3b, condenser lens 5, and field lens 7 to form illumination areas with uniform illumination intensity on the reflection liquid crystal display elements 10a, 10b, and 10c.

Each of many light beams emerging from the fly-eye lens 3b is split into P-polarized light and S-polarized light by the corresponding polarization split film 4a. The P-polarized light is converted by the λ/2 retardation plate 4c into a polarized light component in the same direction as that of the S-polarized light. The S-polarized light is reflected by the reflecting film 4b. With this operation, the many light beams emerging from the fly-eye lens 3b are output in the same direction as light having a predetermined polarization direction.

Of the light uniformly converted into S-polarized light by the polarization conversion element 4, light in the blue and green wavelength regions (to be referred to as blue light and green light hereinafter) is converted into P-polarized light by being changed in their polarization directions by 90° by the color selective retardation plate 9a. The polarization direction of red wavelength region light (to be referred as red light hereinafter) is not changed by the color selective retardation plate 9a, and the light emerges as S-polarized light. These color lights are incident on the polarizing beam splitter 8a serving as part of a color separation system.

The red light as S-polarized light is reflected by the polarization split film of the polarizing beam splitter 8a, and the blue light and green light as P-polarized light are transmitted through this film, thereby performing color separation.

The red light reflected by the polarizing beam splitter 8a is incident on the first polarizing beam splitter 8b, reflected by the polarization split film of the first polarizing beam splitter 8b, and incident on the first reflection liquid crystal display element 10a.

Of the blue light and green light transmitted through the polarizing beam splitter 8a, only the green light is changed in the polarization direction by 90° by the first color selective retardation plate 9b to become S-polarized light, and the blue light remains as P-polarized light and strikes the second polarizing beam splitter 8c.

The blue light as P-polarized light is transmitted through the polarization split film of the second polarizing beam splitter 8c, but the green light as S-polarized light is reflected by the polarization split film. This separates the blue light and green light whose polarization directions are perpendicular to each other.

The green light reflected by the second polarizing beam splitter 8c is incident on the second reflection liquid crystal display element 10b, and the blue light transmitted through the polarizing beam splitter 8c is incident on the third reflection liquid crystal display element 10c.

The red light reflected and modulated by the first reflection liquid crystal display element 10a becomes P-polarized light and is transmitted through polarization split film of the second polarizing beam splitter 8b. The red light is further changed in the polarization direction by 90° by the λ/2 retardation plate 11 to become S-polarized light and is incident on the third polarizing beam splitter 8d. The red light that has become S-polarized light is reflected by the polarization split film of the third polarizing beam splitter 8*d* and guided to the projection lens system 12 to be projected on a screen (not shown) or the like.

The green light reflected and modulated by the second reflection liquid crystal display element 10*b* becomes P-polarized light and is transmitted through the polarization split film of the second polarizing beam splitter 8*c*. The green light as P-polarized light that has been transmitted through the second polarizing beam splitter 8*c* is not changed in the polarization direction by the second color selective retardation plate 9*c*, which changes the polarization direction of only blue light by 90°, but is transmitted therethrough as P-polarize d light and incident on the third polarizing beam splitter 8*d*. This light is then transmitted through the polarization split film of the third polarizing beam splitter 8*d*, guided to the projection lens system 12, and projected on the screen or the like.

The blue light reflected and modulated by the third reflection liquid crystal display element 10*c* becomes S-polarized light and is reflected by the polarization split film of the second polarizing beam splitter 8*c*. This light is further incident on the second color selective retardation plate 9*c*. The blue light as S-polarized light is changed in the polarization direction by 90° by the second color selective retardation plate 9*c*. This light is then transmitted through the polarization split film of the third polarizing beam splitter 8*d*, guided to the projection lens system 12, and projected on the screen or the like.

Figure 2:
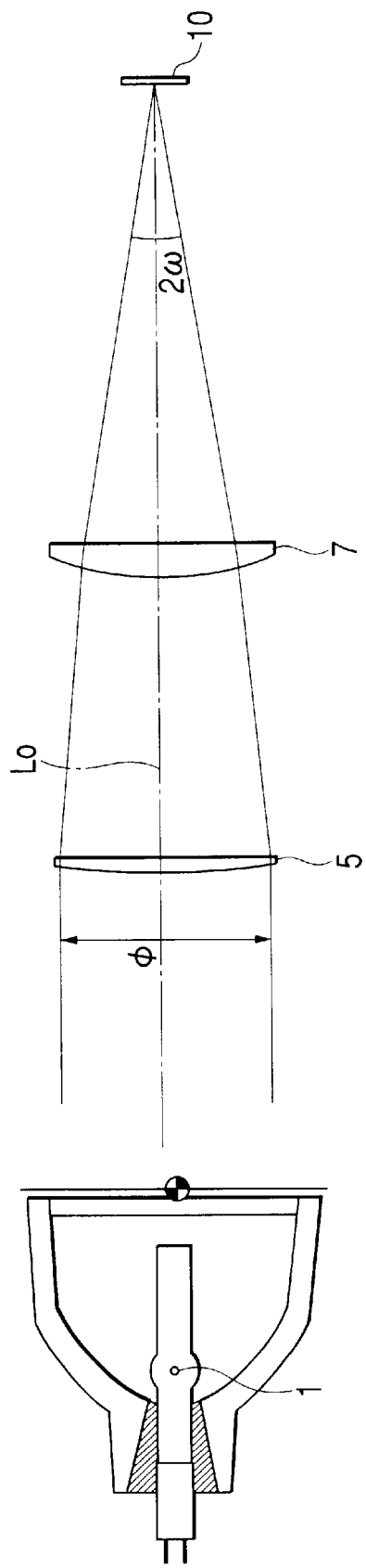
FIG. 2 is a view for explaining incident angles on a reflection liquid crystal display element in the above projection image display apparatus.

In this case, a focusing optical system for focusing illumination light incident from the illumination optical system onto the respective polarizing beam splitters is constituted by the condenser lens 5 and field lens 7. With this arrangement, the nearly parallel light beam emitted from the light source 1 is focused by the condenser lens 5 and field lens 7 and incident on each reflection liquid crystal display element 10 with a divergent angle 2ω centered on an optical axis Lo, as shown in FIG. 2. Letting f be the composite focal length of the condenser lens 5 and field lens 7 and Φ be the effective region width of the condenser lens 5 in the polarizing surface tilting direction in FIG. 1, a divergent angle ω with respect to the optical axis Lo can be expressed by $$\omega = \tan^{-1}(\Phi/2f)$$

Table 1 shows the lens data of the fly-eye lens 3 shown in FIG. 2. In this case, r represents the radius of curvature of each lens surface; d, the interval between the lens surfaces; and, n, the refractive index of glass.

TABLE 1

| Plane | r | d | n |
|---|---|---|---|
| 1 | 25.2 | 2.5 | 1.516 |
| 2 | ∞ | 40.5 | |
| 3 | ∞ | 2.5 | 1.516 |
| 4 | −22.6 | 3 | |

Table 2 shows the lens data of the focusing optical system shown in FIG. 2.

TABLE 2

| Plane | r | d | n |
|---|---|---|---|
| 5 | 123.4 | 3.5 | 1.516 |
| 6 | ∞ | 128.6 | |
| 7 | 67.6 | 3.7 | 1.516 |
| 8 | ∞ | | |

Note that in Tables 1 and 2, planes 1 and 2 indicate the fly-eye lens 3*a*; planes 3 and 4, the fly-eye lens 3*b*; planes 5 and 6, the condenser lens 5; and planes 7 and 8, the field lens 7.

According to Table 2, the composite focal length f of the focusing optical system is given by $$f = 130.7 \text{ mm}$$

and the effective region width Φ of the condenser lens 5 in the polarizing surface tilting direction is given by $$\Phi = 42.0 \text{ mm}$$

The incident angle ω on the reflection liquid crystal display element is obtained from the relationship between the composite focal length f, the effective region width Φ of the condenser lens 5 in the polarizing surface tilting direction, and the incident angle ω as follows:

$$\omega = 9.1°$$

Figure 3:
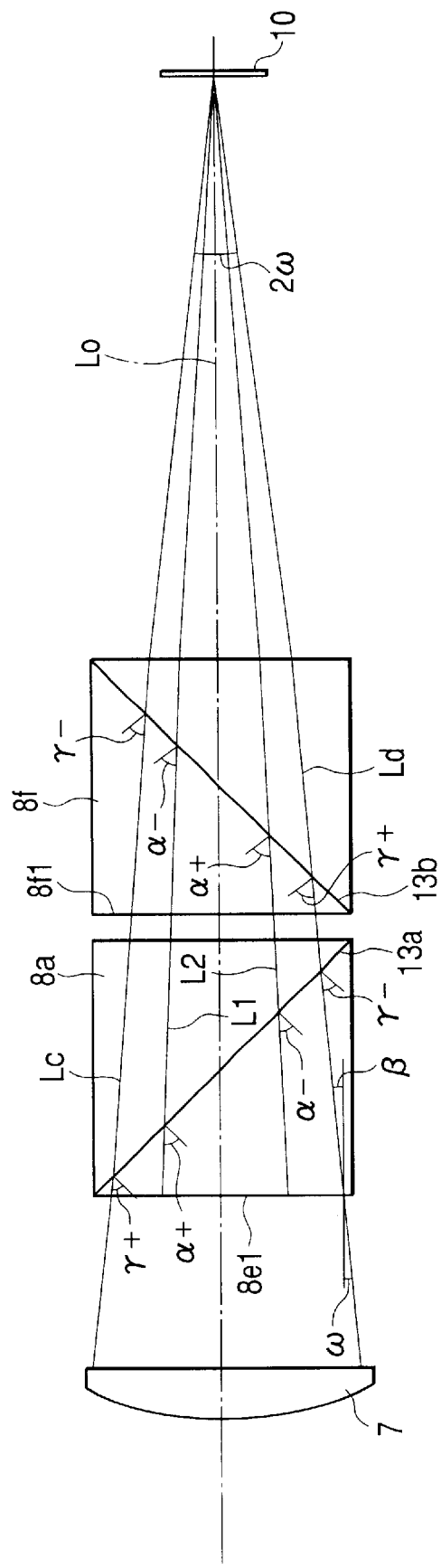
FIG. 3 is a view for explaining incident angles on the polarization split films of polarizing beam splitters in the projection image display apparatus.

In addition, as shown in FIG. 3, the light beam emerging from the field lens 7 is incident on the reflection liquid crystal display element 10 after being reflected by or transmitted through the two polarizing beam splitters 8*e* and 8*f* (the polarizing beam splitters 8*a* and 8*b* on the red light path, and the polarizing beam splitters 8*a* and 8*c* on the green and blue light paths). At this time, the light beam emerging from the field lens 7 is incident on the polarizing beam splitter 8*e* with the divergent angle ω, and the light beam incident on the polarizing beam splitter 8*e* is refracted by a glass surface 8*e*1 of the polarizing beam splitter 8*e* and incident on a polarization split film 13*a*. The incident angle ω of a light ray, of the light rays incident on the glass surface 8*e*1 of the polarizing beam splitter 8*e*, which has the maximum angle with respect to the optical axis Lo (an axis parallel to the optical axis) is 9.1°. Therefore, according to Smell laws of refraction, an angle of refraction β of the light ray with respect to the optical axis Lo on the glass surface 8*e*1 of the polarizing beam splitter 8*e* is given by $$\sin \omega = n \cdot \sin \beta$$

where n is the refractive index of the glass of the polarizing beam splitter 8*e*, and β is the angle of refraction on the glass surface 8*e*1 of the polarizing beam splitter 8*e*.

Since the glass of the polarizing beam splitters 8*a*, 8*b*, 8*c*, and 8*d* shown in FIG. 1 is BK7 (n=1.516), the angle of refraction β of the above light ray on the glass surface 8*e*1 is given by $$\beta = 6.0°$$

The upper and lower light rays in FIG. 3 which are refracted at an angle of 6.0° by the glass surface 8*e*1 of the polarizing beam splitter 8*e*, are incident on the polarization split film 13*a*. Letting Lc be the light ray, of these light rays, which is incident on the polarization split film 13*a* at a larger angle (y+), and Ld be the light ray incident at a smaller angle (y−) then the incident angles of the light rays Lc and Ld on the polarization split film 13*a* become (45+6.0)° and (45−6.0)°, respectively.

The light transmitted through the polarizing beam splitter 8*e* is refracted by a glass surface 8*f*1 of a polarizing beam splitter 8*f* and incident on a polarization split film 13*b*.

At this time, the incident angle of the light ray Lc on the polarization split film 13*b* is the smaller angle<y−=(45−6.0)°>, and the incident angle of the light ray Ld is the larger angle <y+=(45−+6.0)°>.

The light rays Lc and Ld transmitted through the polarizing beam splitter 8*f* are incident on the reflection liquid crystal display element 10 at an angle of 9.1°.

A first light ray (upper light ray) L1 and second light ray (lower light ray) L2 in FIG. 3 are respectively light rays which have incident angles corresponding to 55% of the maximum angle β of the light rays Lc and Ld incident on the polarizing beam splitters 8e and 8f with respect to the optical axis Lo. An incident angle α+ of the first light ray L1 on the polarization split film 13a is (45+3.3)°, and an incident angle α− of the second light ray L2 on the polarization split film 13a is (45−3.3)°.

Figure 4A:
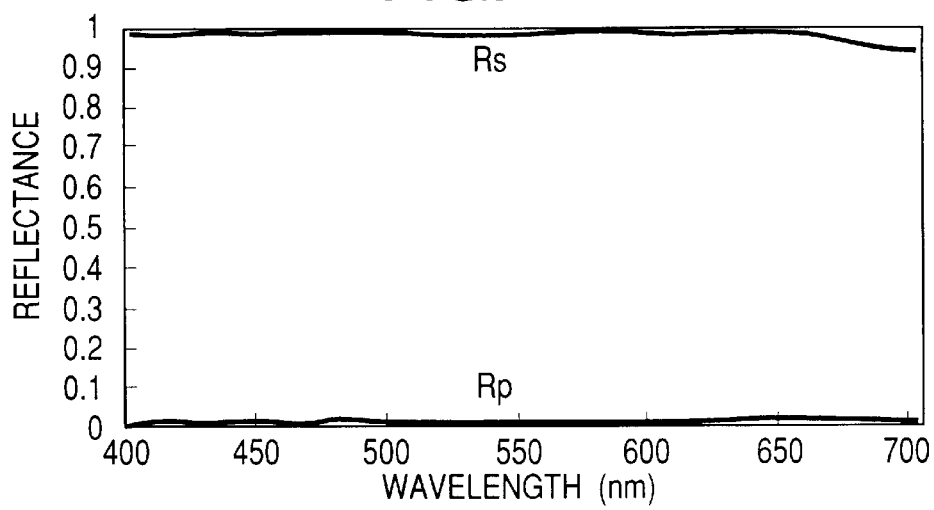
FIGS. 4A, 4B and 4C are graphs showing the reflectance characteristics of the above polarizing beam splitters.
Figure 4B:
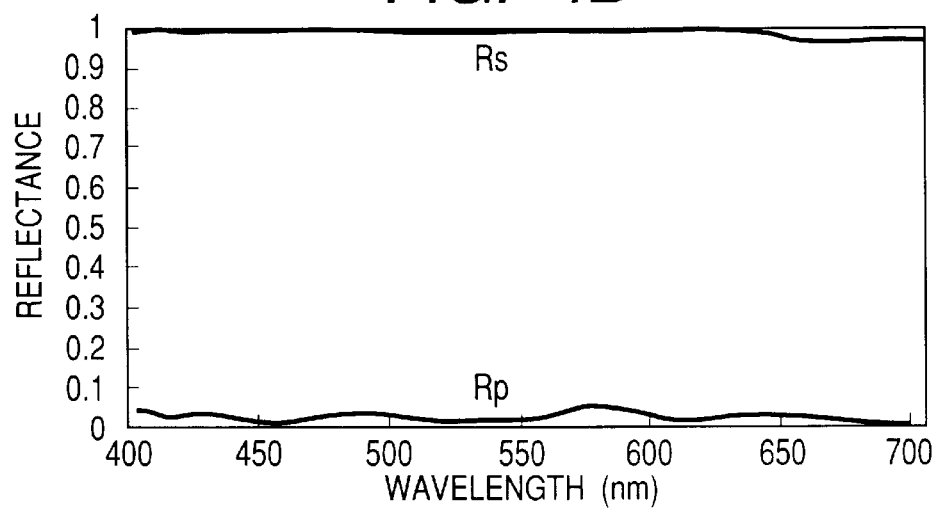
Figure 4C:
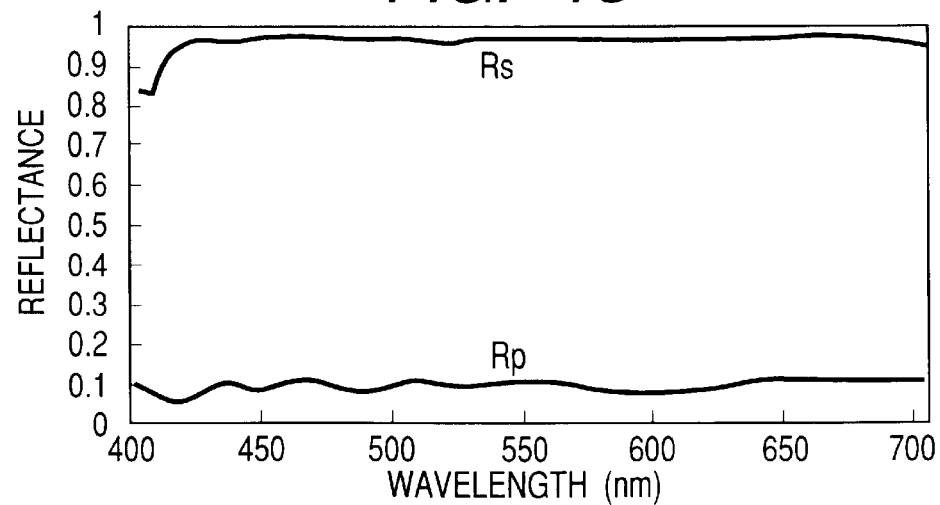

FIGS. 4A to 4C show the reflectance characteristics of the polarization split films of the polarizing beam splitters 8a, 8b, 8c, and 8d in FIG. 1 with respect to light rays with incident angles of 45°, 48.3° (the incident angle of the first light ray L1), and 41.7° (the incident angle of the second light ray L2). Referring to FIGS. 4A to 4C, Rs represents the reflectance of S-polarized light; and Rp, the reflectance of P-polarized light.

Each polarization split film is formed by alternately stacking a total of 27 high reflectance layers (H) and low reflectance layers (L) on a substrate made of BK7. Table 3 shows constants representing the refractive index variances of the respective layers of each polarization split film and the thicknesses of the respective layers. Constants a, b, and c in Table 3 are constants representing the refractive index variances of the respective layers, and a refractive index n(λ) at a wavelength λ is given by $$n(\lambda) = a + \frac{c}{\lambda - b}$$

TABLE 3

| Number of Layer(s) | | Thickness (nm) | a | b | c |
|---|---|---|---|---|---|
| 1 | H (high reflectance layer) | 240 | 1.75 | 235 | 15 |
| 2 | L (low reflectance layer) | 301 | 1.38 | 0 | 0 |
| 3 | H | 207 | 1.75 | 235 | 15 |
| 4 | L | 271 | 1.38 | 0 | 0 |
| 5 | H | 223 | 1.75 | 235 | 15 |
| 6 | L | 228 | 1.38 | 0 | 0 |
| 7 | H | 213 | 1.75 | 235 | 15 |
| 8 | L | 239 | 1.38 | 0 | 0 |
| 9 | H | 183 | 1.75 | 235 | 15 |
| 10 | L | 211 | 1.38 | 0 | 0 |
| 11 | H | 189 | 1.75 | 235 | 15 |
| 12 | L | 227 | 1.38 | 0 | 0 |
| 13 | H | 146 | 1.75 | 235 | 15 |
| 14 | L | 190 | 1.38 | 0 | 0 |
| 15 | H | 149 | 1.75 | 235 | 15 |
| 16 | L | 196 | 1.38 | 0 | 0 |
| 17 | H | 155 | 1.75 | 235 | 15 |
| 18 | L | 190 | 1.38 | 0 | 0 |
| 19 | H | 119 | 1.75 | 235 | 15 |
| 20 | L | 157 | 1.38 | 0 | 0 |
| 21 | H | 142 | 1.75 | 235 | 15 |
| 22 | L | 177 | 1.38 | 0 | 0 |
| 23 | H | 110 | 1.75 | 235 | 15 |
| 24 | L | 115 | 1.38 | 0 | 0 |
| 25 | H | 132 | 1.75 | 235 | 15 |
| 26 | L | 135 | 1.38 | 0 | 0 |
| 27 | H | 60 | 1.75 | 235 | 15 |

Referring to FIG. 1, letting $Tsa_{(b)}1(\lambda)$ be the transmittance of the polarizing beam splitter 8b for the S-polarized light of the first light ray L1, and $Tpb_{(d)}1(\lambda)$ be the transmittance of the polarizing beam splitter 8d for the P-polarized light of the first light ray L1, analysis performance $Kr1(\lambda)$ with to the first light ray L1 on each of the polarization split films of the polarizing beam splitters 8b and 8d on the red light path is represented by $$Kr1(\lambda) = Tsa_{(b)}1(\lambda) \cdot (1 - Tpb_{(d)}1(\lambda))$$

In addition, letting $Tsa_{(b)}2(\lambda)$ be the transmittance of the polarizing beam splitter 8b for the S-polarized light of the second light ray L2, and $Tpb_{(d)}2(\lambda)$ be the transmittance of the polarizing beam splitter 8d for the P-polarized light of the second light ray L2, analysis performance $Kr2(\lambda)$ with respect to the second light ray L2 on each of the polarization split films of the polarizing beam splitters 8b and 8d on the red light path is represented by $$Kr2(\lambda) = Tsa_{(b)}2(\lambda) \cdot (1 - Tpb_{(d)}2(\lambda))$$

In this case, a light shielding characteristic value $L_R$ on the red light path is expressed by $$L_R = \int_{590\ nm}^{650\ nm} \{Kr1(\lambda) + Kr2(\lambda)\} \times Y(\lambda)\,d\lambda \Big/ 2\int_{590\ nm}^{650\ nm} Y(\lambda)\,d\lambda$$

According to FIGS. 4A to 4C, $$L_R = 0.00078$$

Figure 5:
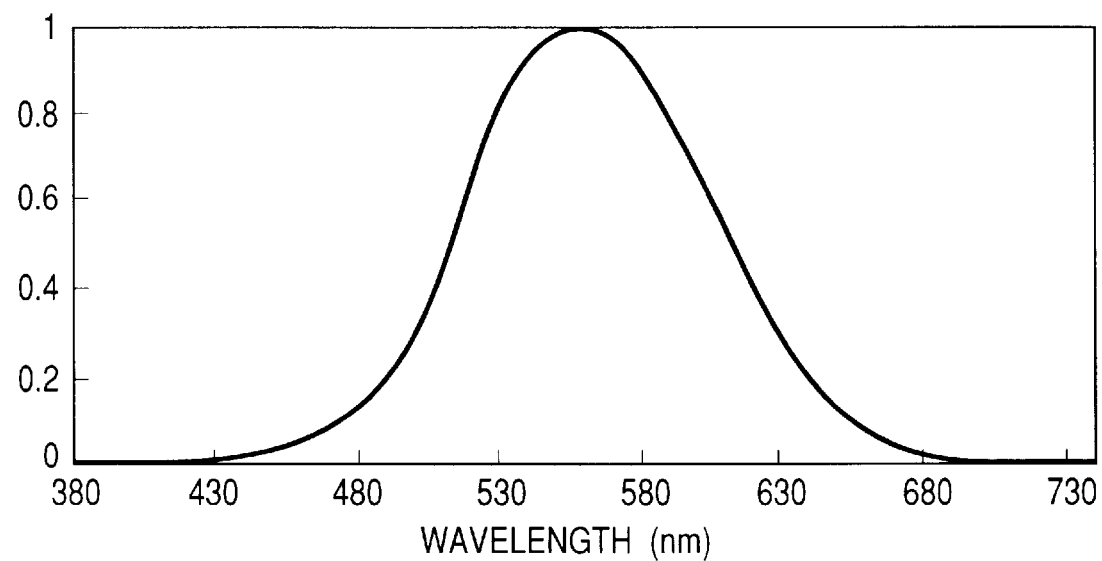
FIG. 5 is a graph showing the relative visibility of the human eye dependent on wavelengths.

In this case, $Y(\lambda)$ represents the relative visibility of the human eye. FIG. 5 is a graph showing this.

Letting $Tsa_{(c)}1(\lambda)$ be the transmittance of the polarizing beam splitter 8c for the S-polarized light of the first light ray L1, and $Tsb_{(d)}1(\lambda)$ be the transmittance of the polarizing beam splitter 8d for the P-polarized light of the first light ray L1, analysis performance $Kg1(\lambda)$ with respect to the first light ray L1 on each of the polarization split films of the polarizing beam splitters 8c and 8d on the green light path is represented by $$Kg1(\lambda) = Tsa_{(c)}1(\lambda) \cdot Tsb_{(d)}1(\lambda)$$

In addition, letting $Tsa_{(c)}2(\lambda)$ be the transmittance of the polarizing beam splitter 8c for the S-polarized light of the second light ray L2, and $Tsb_{(d)}2(\lambda)$ be the transmittance of the polarizing beam splitter 8d for the P-polarized light of the second light ray L2, analysis performance $Kg2(\lambda)$ with respect to the second light ray L2 on each of the polarization split films of the polarizing beam splitters 8c and 8d on the green light path is represented by $$Kg2(\lambda) = Tsa_{(c)}2(\lambda) \cdot Tsb_{(d)}2(\lambda)$$

In this case, a light shielding characteristic value $L_G$ on the green light path is expressed by $$L_G = \int_{500\ nm}^{580\ nm} \{Kg1(\lambda) + Kg2(\lambda)\} \times Y(\lambda)\,d\lambda \Big/ 2\int_{500\ nm}^{580\ nm} Y(\lambda)\,d\lambda$$

According to FIGS. 4A to 4C, $$L_G = 0.00014$$

Letting $Tpa_{(c)}1(\lambda)$ be the transmittance of the polarizing beam splitter 8c for the P-polarized light of the first light ray L1, and $Tsb_{(d)}1(\lambda)$ be the transmittance of the polarizing beam splitter 8d for the S-polarized light of the first light ray L1, analysis performance $Kb1(\lambda)$ with respect to the first light ray L1 on each of the polarization split films of the polarizing beam splitters 8*c* and 8*d* on the blue light path is represented by $$Kb1(\lambda)=(1-Tpa_{(c)}1\ (\lambda))\cdot Tsb_{(d)}1(\lambda)$$

In addition, letting $Tpa_{(c)}2(\lambda)$ be the transmittance of the polarizing beam splitter 8*c* for the P-polarized light of the second light ray L2, and $Tsb_{(d)}2(\lambda)$ be the transmittance of the polarizing beam splitter 8*d* for the S-polarized light of the second light ray L2, analysis performance $Kb2(\lambda)$ with respect to the second light ray L2 on each of the polarization split films of the polarizing beam splitters 8*c* and 8*d* on the blue light path is represented by $$Kb2(\lambda)=(1-Tpa_{(c)}2(\lambda))\cdot Tsb_{(d)}2(\lambda)$$

In this case, a light shielding characteristic value $L_B$ on the blue light path is expressed by $$L_B = \int_{430\ nm}^{490\ nm}\{Kb1(\lambda)+Kb2(\lambda)\}\times Y(\lambda)d\lambda \Big/ 2\int_{430\ nm}^{490\ nm}Y(\lambda)d\lambda$$

According to FIGS. 4A to 4C, $$L_B=0.00071$$

Therefore, $$L_R, L_G, L_B<0.002<0.006$$

The light shielding characteristic values $L_R$, $L_G$, and $L_B$ calculated on the red, green, and blue light paths satisfy conditions required to project motion pictures and the like which include many dark images such as night scenes and demand high contrast. By satisfying inequality (1) of $L_R$, $L_G$, $L_B<0.006$, the amount of black leakage light that is not modulated by the image display element can be sufficiently reduced, and high-contrast images can be projected and displayed. By satisfying inequality (2) of $L_R$, $L_G$, $L_B<0.002$, the amount of black leakage light can be further reduced, and images which include many dark images such as night scenes and demand high contrast can also be projected and displayed.

In this embodiment, the color separation system (ranging from the light source to the image display elements) has been mainly described. However, the same applies to the color synthesis system (ranging from the image display elements to the projection optical system) because the light reflected by each image display element propagates through the same optical path in the reverse direction to that in the color separation system.

Figure 14:
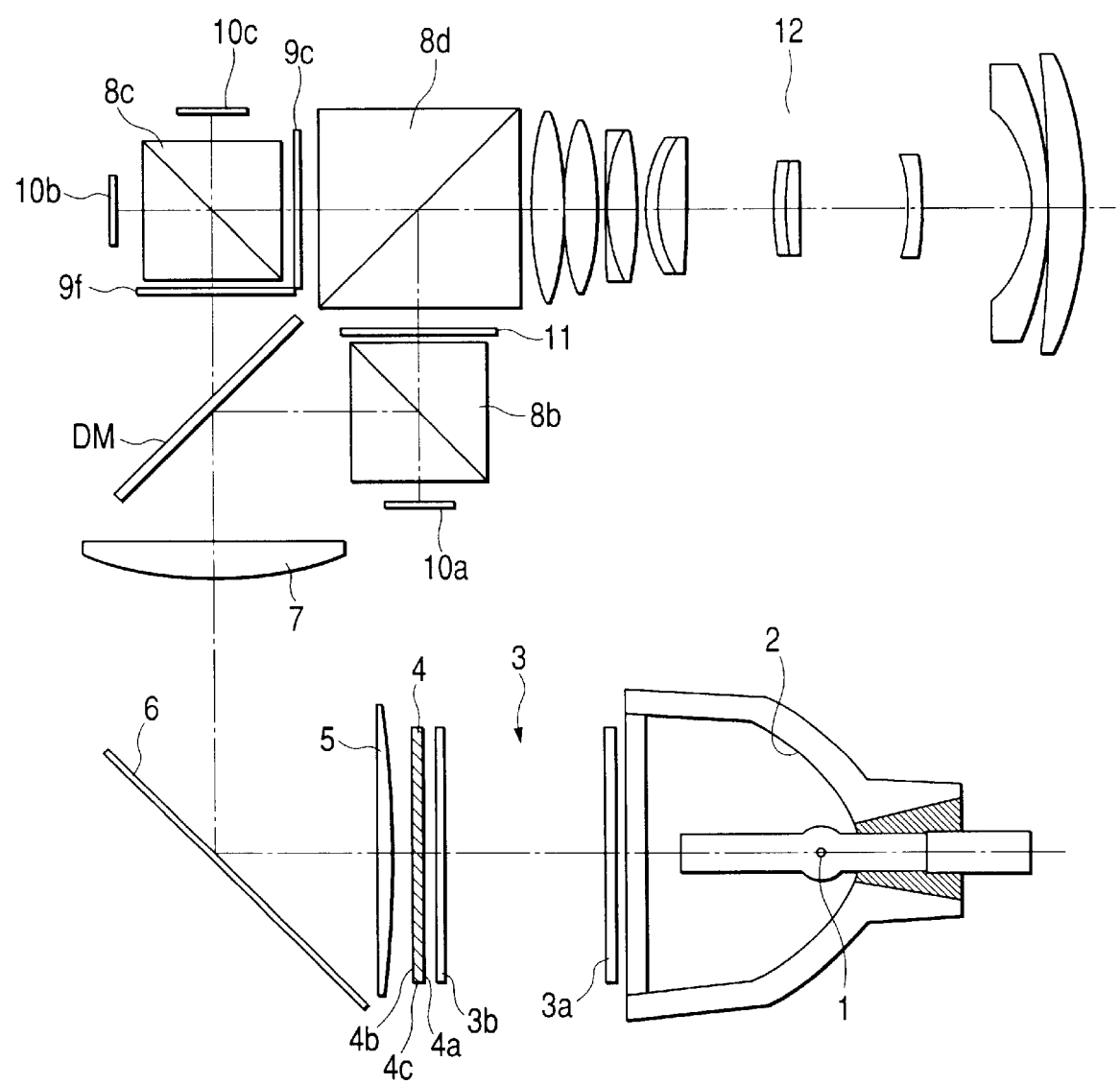
FIG. 14 is a view showing the optical arrangement of a projection image display apparatus according to a modification to the first embodiment.
Figure 15:
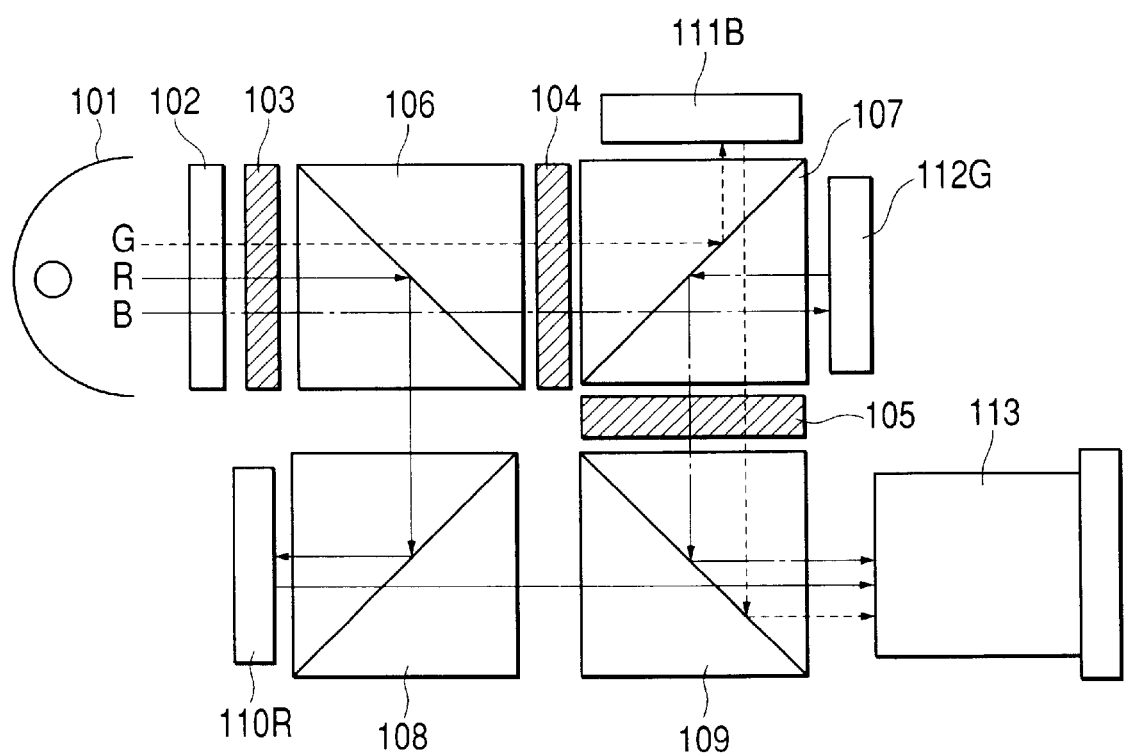
FIG. 15 is a view showing the optical arrangement of a conventional projection image display apparatus.
Figure 16:
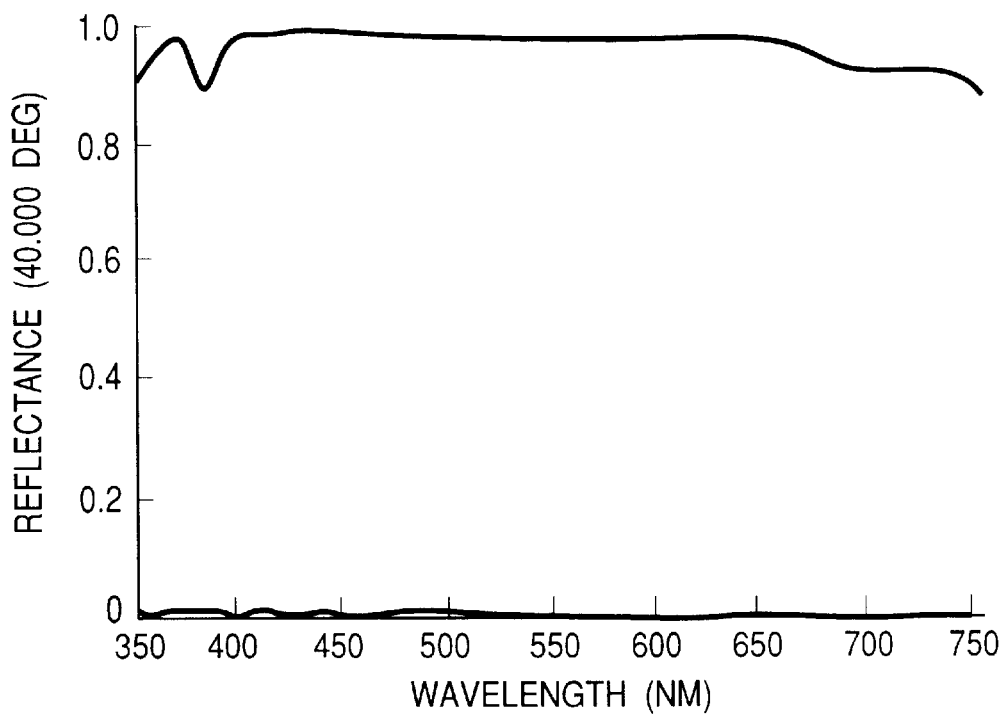
FIG. 16 is a graph showing the reflectance characteristics of a polarization split film at an incident angle of 45°.
Figure 17:
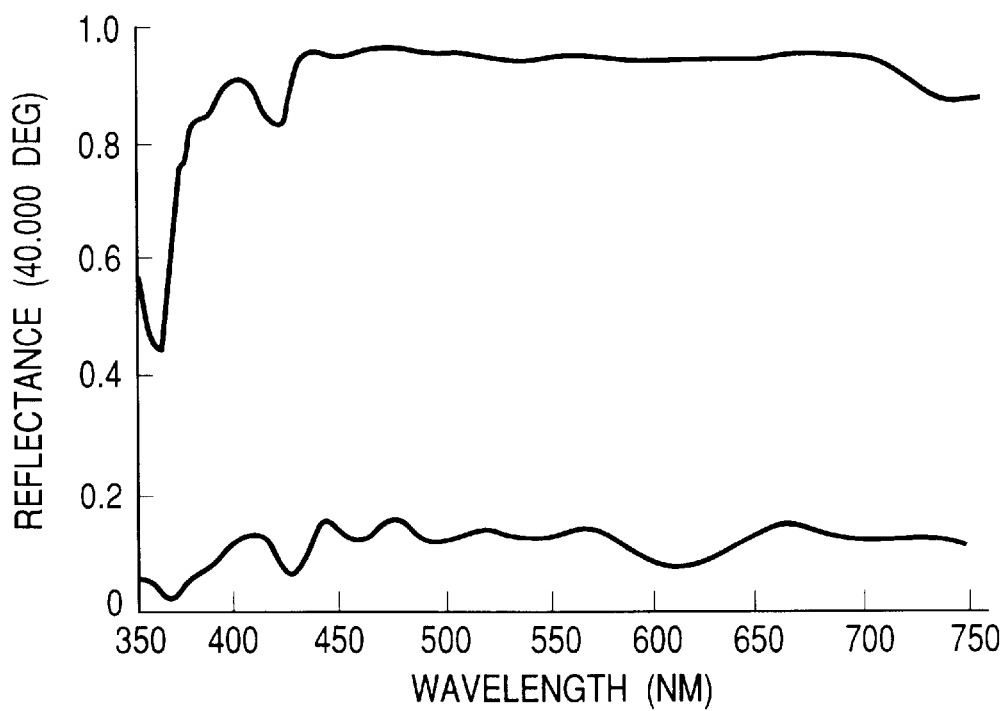
FIG. 17 is a graph showing the reflectance characteristics of a polarization split film at an incident angle deviating from 45°.
Figure 18:
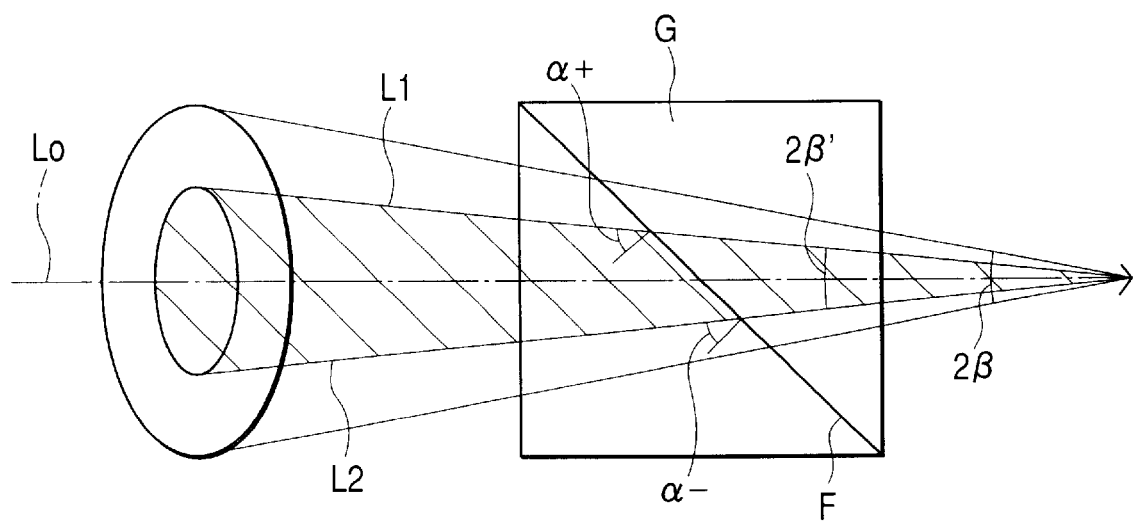
FIG. 18 is a view for explaining first and second light rays.

FIG. 14 shows a modification to the first embodiment. This modification differs from the first embodiment in the following points. First, the modification uses a dichroic mirror DM for reflecting light in the red wavelength region and transmitting light in the blue and green wavelength regions instead of the polarizing beam splitter 8*a*. Second, the color selective retardation plate 9*a* is removed. Third, a color selective retardation plate 9*f* (identical to the color selective retardation plate 9*c*) for changing the polarization direction of light in the blue wavelength region by 90° without changing the polarization direction of light in the green wavelength region is placed at the position where the color selective retardation plate 9*b* was placed. With this arrangement as well, the same effect as that of the first embodiment can be obtained by an arrangement similar to the arrangement including components ranging from the image display elements to the projection optical system in the first embodiment as long as the above necessary conditions are satisfied.

Second Embodiment

Figure 6:
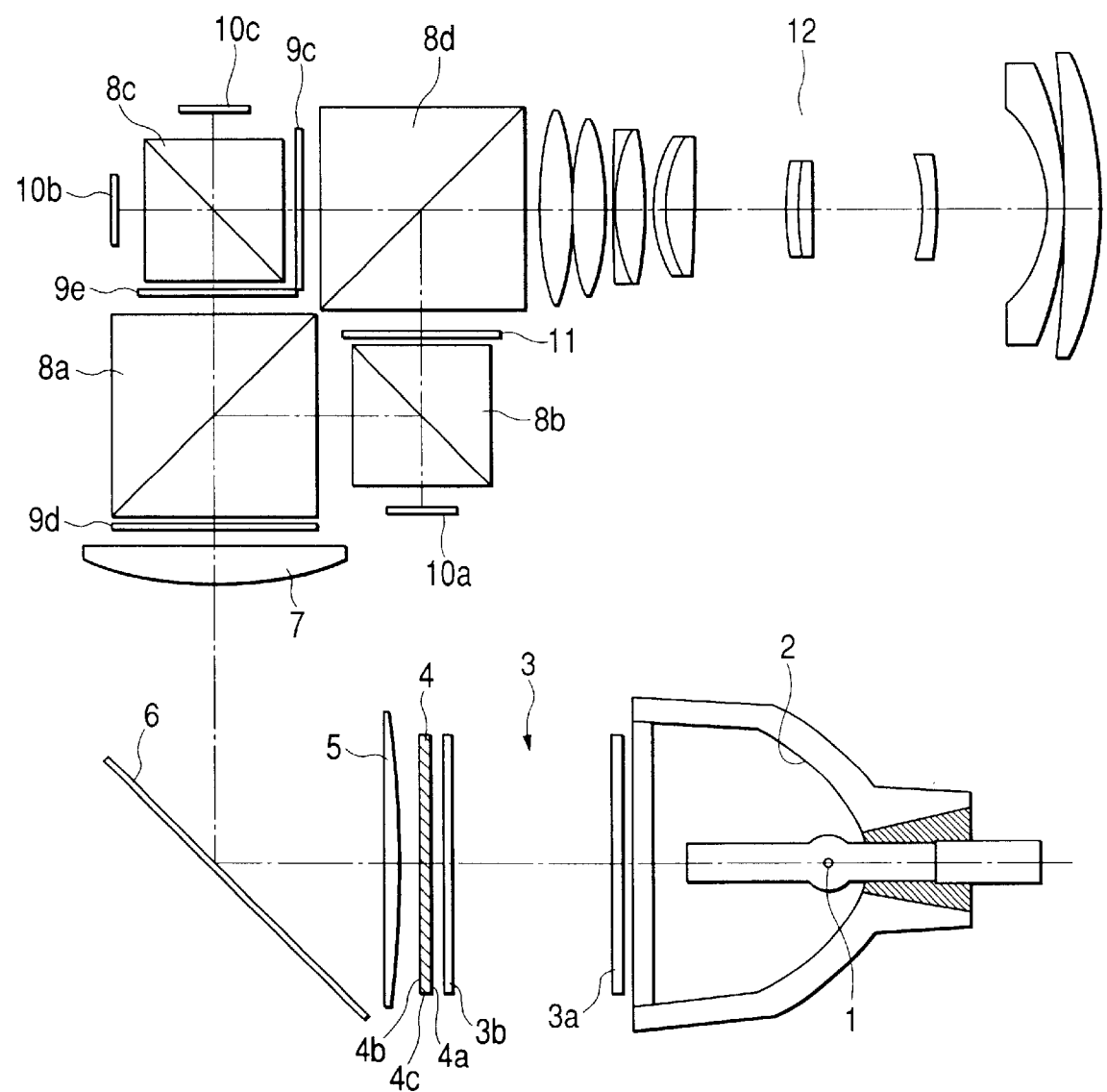
FIG. 6 is a view showing the optical arrangement of a projection image display apparatus according to the second embodiment of the present invention.

FIG. 6 shows the optical arrangement of a projection image display apparatus according to the second embodiment of the present invention. Note that the same reference numerals as in the first embodiment denote the same parts in the second embodiment.

In this embodiment, the amount of light vignetted by a polarization conversion element 4 is reduced and the amount of light projected is increased by setting a focal length F1 of a first fly-eye lens 3*a* to a small value and reducing the size of a light source image formed near a polarization conversion element 4*k*.

Let F1 be the focal length of the first fly-eye lens 3*a*, and F2 be the focal length of a second fly-eye lens 3*b*. In the fly-eye lens system, if $$F1<F2$$

then the light source image formed by the first fly-eye lens 3*a* is focused on the polarization conversion element 4 near the second fly-eye lens 3*b*, thereby increasing the polarization conversion efficiency. If, therefore, the focal length F1 of the first fly-eye lens 3*a* is set to be small, the focal length F2 of the second fly-eye lens 3*b* must also be set to be small.

Letting f be the composite focal length of the focusing optical system and flay-eye lens system, a rectangular image of the first fly-eye lens 3*a* is formed on the reflection liquid crystal display element at a magnification T determined by $$T=f/F2$$

The composite focal length f of the focusing optical system must also be decreased in accordance with the focal length F2 of the second fly-eye lens 3*b* to make the magnification T equal to that in the first embodiment.

Table 4 shows the lens data of the fly-eye lens 3 shown in FIG. 6. In this case, r represents the radius of curvature of each lens surface; d, the interval between the lens surfaces; and, n, the refractive index of glass.

TABLE 4

| Plane | r | d | n |
| --- | --- | --- | --- |
| 1 | 17.3 | 2.5 | 1.516 |
| 2 | ∞ | 24.8 | |
| 3 | ∞ | 2.5 | 1.516 |
| 4 | −14.5 | 3 | |

In addition, Table 5 shows the lens data of the focusing optical system shown in FIG. 6.

TABLE 5

| Plane | r | d | n |
| --- | --- | --- | --- |
| 1 | 146.6 | 3.5 | 1.516 |
| 2 | ∞ | 81.7 | |
| 3 | 34.4 | 3.7 | 1.516 |
| 4 | ∞ | | |

Note that in Tables 4 and 5, planes 1 and 2 indicate the fly-eye lens 3*a*; planes 3 and 4, the fly-eye lens 3*b*; planes 5 and 6, a condenser lens 5; and planes 7 and 8, a field lens 7.

According to Table 5, the composite focal length f of the focusing optical system is given by $$f=83.8 \text{ mm}$$

which is smaller than that in the first embodiment.

In this case, an effective region width Φ of the condenser lens 5 in the polarizing surface tilting direction is given by $$\Phi=42.0 \text{ mm}$$

The incident angle ω on the reflection liquid crystal display element is obtained from the relationship between the composite focal length f, the effective region width Φ of the condenser lens 5 in the polarizing surface tilting direction, and the incident angle ω as follows:

$$\omega=14.0°$$

In addition, as shown in FIG. 3, the incident angle ω of light incident on a glass surface 8e1 of a polarizing beam splitter 8e is 14.0°. Therefore, according to Smell laws of refraction, an angle of refraction β on the glass surface 8e1 of the polarizing beam splitter 8e is given by $$\beta=9.2°$$

The upper and lower light rays in FIG. 3 which are refracted at an angle of 9.2° by the glass surface 8e1 of the polarizing beam splitter 8e are incident on a polarization split film 13a. The incident angle of a light ray Lc on the polarization split film 13a becomes a larger angle <y+=(45+9.2)°>, and the incident angle of a light ray Ld becomes a smaller angle <y-=(45-9.2)°>.

The light transmitted through the polarizing beam splitter 8e is refracted by a glass surface 8f1 of a polarizing beam splitter 8f and incident on a polarization split film 13b.

At this time, the incident angle of the light ray Lc on the polarization split film 13b is the smaller angle <y-=(45-9.2)°>, and the incident angle of the light ray Ld is the larger angle <y+=(45+9.2)°>.

The light rays Lc and Ld transmitted through the polarizing beam splitter 8f are incident on the reflection liquid crystal display element 10 at an angle of 14.0°.

A first light ray (upper light ray) L1 and second light ray (lower light ray) L2 in FIG. 3 are respectively light rays which have incident angles corresponding to 55% of the maximum angle β of the light rays Lc and Ld incident on the polarizing beam splitters 8e and 8f with respect to an optical axis Lo. An incident angle α+ of the first light ray L1 on the polarization split film 13a is (45+5.1)°, and an incident angle α− of the second light ray L2 on the polarization split film 13a is (45−5.1)°.

Figure 7A:
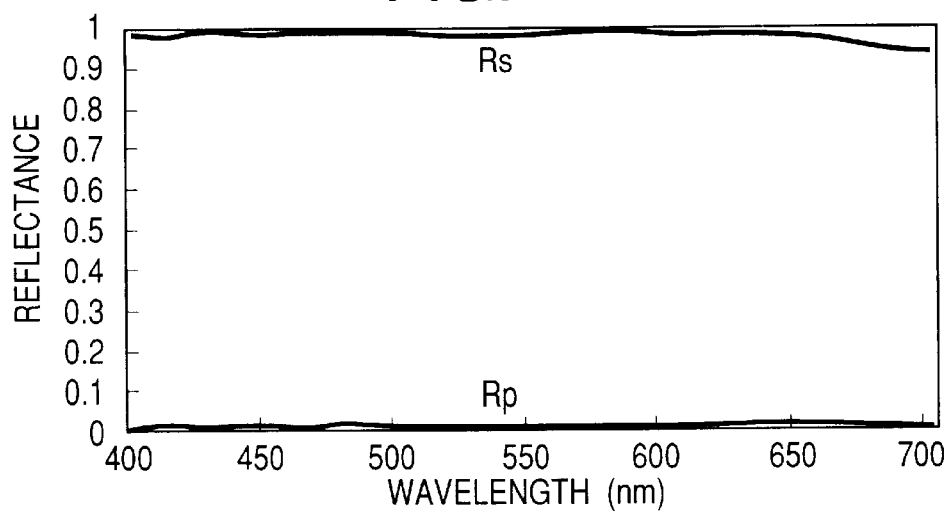
FIGS. 7A, 7B and 7C are graphs showing the reflectance characteristics of polarizing beam splitters in the projection image display apparatus according to the second embodiment.
Figure 7B:
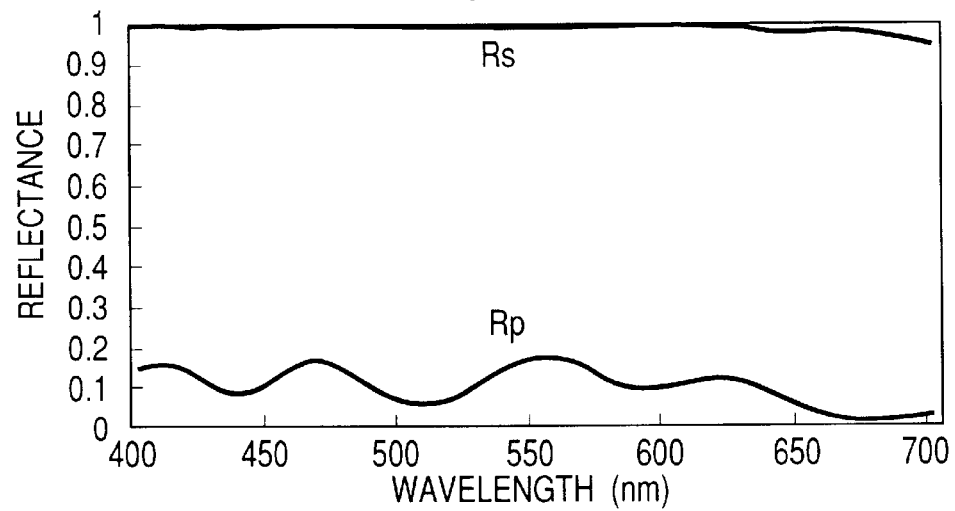
Figure 7C:
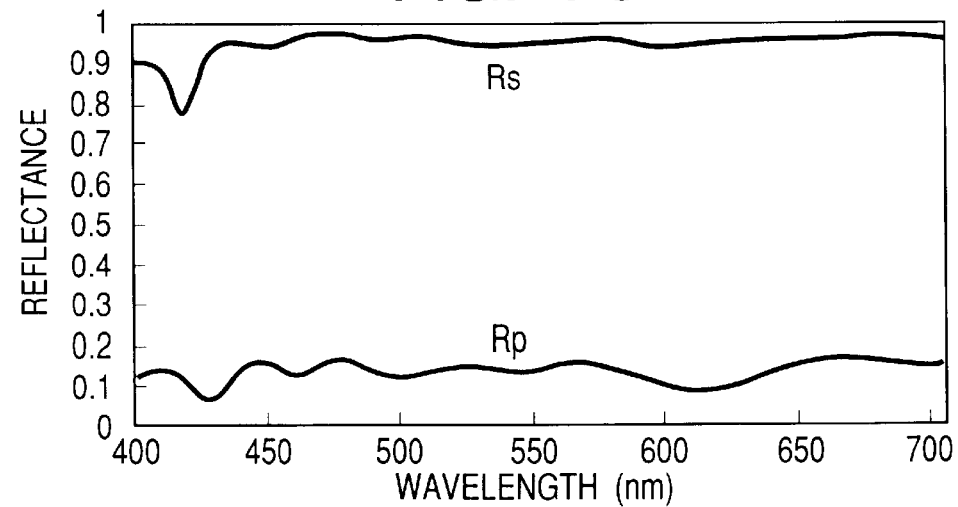

FIGS. 7A to 7C show the reflectance characteristics of the polarization split films of polarizing beam splitters 8a, 8b, 8c, and 8d in FIG. 6 with respect to light rays with incident angles of 45°, 50.1° (the incident angle of the first light ray L1), and 39.9° (the incident angle of the second light ray L2). Referring to FIGS. 7A to 7C, Rs represents the reflectance of S-polarized light; and Rp, the reflectance of P-polarized light.

Note that this embodiment uses a polarization split film having the arrangement described in the first embodiment and characteristics described in Table 3.

Referring to FIG. 6, each of color selective retardation plates 9b, 9e, and 9c changes (rotates) the polarization direction of light in a predetermined wavelength region by 90°.

Of the light uniformly converted into S-polarized light by the polarization conversion element 4, light in the blue and red wavelength regions (to be referred to as blue light and red light hereinafter) is converted into P-polarized light by being changed in their polarization directions by 90° by the color selective retardation plate 9d. The polarization direction of green wavelength region light (to be referred as green light hereinafter) is not changed by the color selective retardation plate 9d, and the light emerges as S-polarized light. These color lights are incident on the polarizing beam splitter 8a serving as part of a color separation system.

The green light as S-polarized light is reflected by the polarization split film of the polarizing beam splitter 8a, and the blue light and red light as P-polarized light are transmitted through this film, thereby performing color separation.

The green light reflected by the polarizing beam splitter 8a is incident on the first polarizing beam splitter 8b, reflected by the polarization split film of the first polarizing beam splitter 8b, and incident on the first reflection liquid crystal display element 10a.

Of the blue light and red light as P-polarized lights transmitted through the polarizing beam splitter 8a, only the red light is changed in the polarization direction by 90° by the first color selective retardation plate 9b to become S-polarized light, and the blue light remains as P-polarized light and strikes the second polarizing beam splitter 8c.

The blue light as P-polarized light is transmitted through the polarization split film of the second polarizing beam splitter 8c, but the red light as S-polarized light is reflected by the polarization split film. This separates the blue light and red light whose polarization directions are perpendicular to each other.

The red light reflected by the second polarizing beam splitter 8c is incident on a second reflection liquid crystal display element 10b, and the blue light transmitted through the polarizing beam splitter 8c is incident on a third reflection liquid crystal display element 10c.

The green light reflected and modulated by a first reflection liquid crystal display element 10a becomes P-polarized light and is transmitted through polarization split film of the second polarizing beam splitter 8b. The green light is further changed in the polarization direction by 90° by a λ/2 retardation plate 11 to become S-polarized light and is incident on the third polarizing beam splitter 8d. The green light that has become S-polarized light is reflected by the polarization split film of the third polarizing beam splitter 8d and guided to a projection lens system 12 to be projected on a screen (not shown) or the like.

The red light reflected and modulated by the second reflection liquid crystal display element 10b becomes P-polarized light and is transmitted through the polarization split film of the second polarizing beam splitter 8c. The red light as P-polarized light that has been transmitted through the second polarizing beam splitter 8c is not changed in the polarization direction by the second color selective retardation plate 9c, which changes the polarization direction of only blue light by 90°, but is transmitted therethrough as P-polarized light and incident on the third polarizing beam splitter 8d. This light is then transmitted through the polarization split film of the third polarizing beam splitter 8d, guided to the projection lens system 12, and projected on the screen or the like.

The blue light reflected and modulated by the third reflection liquid crystal display element 10c becomes S-polarized light and is reflected by the polarization split film of the second polarizing beam splitter 8c. This light is further incident on the second color selective retardation plate 9c. The blue light as S-polarized light is changed in the polarization direction by 90° by the second color selective retardation plate 9c to become P-polarized light. This light is then transmitted through the polarization split film of the third polarizing beam splitter 8d, guided to the projection lens system 12, and projected on the screen or the like.

Referring to FIG. 6, letting $Tsa_{(b)}1(\lambda)$ be the transmittance of the polarizing beam splitter 8b for the S-polarized light of the first light ray L1, and $Tpb_{(d)}1(\lambda)$ be the transmittance of the polarizing beam splitter 8d for the P-polarized light of the first light ray L1, analysis performance $Kg1(\lambda)$ with respect to the first light ray L1 on each of the polarization split films of the polarizing beam splitters 8b and 8d on the green light path is represented by $$Kg1(\lambda)=Tsa_{(b)}1(\lambda)\cdot(1-Tpb_{(d)}1(\lambda))$$

In addition, letting $Tsa_{(b)}2(\lambda)$ be the transmittance of the polarizing beam splitter 8b for the S-polarized light of the second light ray L2, and $Tpb_{(d)}2(\lambda)$ be the transmittance of the polarizing beam splitter 8d for the P-polarized light of the second light ray L2, analysis performance $Kg2(\lambda)$ with respect to the second light ray L2 on each of the polarization split films of the polarizing beam splitters 8b and 8d on the green light path is represented by $$Kg2(\lambda)=Tsa_{(b)}2(\lambda)\cdot(1-Tpb_{(d)}2(\lambda))$$

In this case, a light shielding characteristic value $L_G$ on the green light path is expressed by $$L_G = \int_{500\,nm}^{580\,nm} \{Kg1(\lambda)+Kg2(\lambda)\}\times Y(\lambda)d\lambda \bigg/ 2\int_{500\,nm}^{580\,nm} Y(\lambda)d\lambda$$

According to FIGS. 7A to 7C, $$L_G=0.0031$$

Letting $Tsa_{(c)}1(\lambda)$ be the transmittance of the polarizing beam splitter 8c for the S-polarized light of the first light ray L1, and $Tsb_{(d)}1(\lambda)$ be the transmittance of the polarizing beam splitter 8d for the S-polarized light of the first light ray L1, analysis performance $Kr1(\lambda)$ with respect to the first light ray L1 on each of the polarization split films of the polarizing beam splitters 8c and 8d on the red light path is represented by $$Kr1(\lambda)=Tsa_{(c)}1(\lambda)\cdot Tsb_{(d)}1(\lambda)$$

In addition, letting $Tsa_{(c)}2(\lambda)$ be the transmittance of the polarizing beam splitter 8c for the S-polarized light of the second light ray L2, and $Tsb_{(d)}2(\lambda)$ be the transmittance of the polarizing beam splitter 8d for the S-polarized light of the second light ray L2, analysis performance $Kr2(\lambda)$ with respect to the second light ray L2 on each of the polarization split films of the polarizing beam splitters 8c and 8d on the red light path is represented by $$Kr2(\lambda)=Tsa_{(c)}2(\lambda)\cdot Tsb_{(d)}2(\lambda)$$

In this case, a light shielding characteristic value $L_R$ on the red light path is expressed by $$L_R = \int_{590\,nm}^{650\,nm} \{Kr1(\lambda)+Kr2(\lambda)\}\times Y(\lambda)d\lambda \bigg/ 2\int_{590\,nm}^{650\,nm} Y(\lambda)d\lambda$$

According to FIGS. 7A to 7C, $$L_R=0.001$$

Letting $Tpa_{(c)}1(\lambda)$ be the transmittance of the polarizing beam splitter 8c for the P-polarized light of the first light ray L1, and $Tsb_{(d)}1(\lambda)$ be the transmittance of the polarizing beam splitter 8d for the S-polarized light of the first light ray L1, analysis performance $Kb1(\lambda)$ with respect to the first light ray L1 on each of the polarization split films of the polarizing beam splitters 8c and 8d on the blue light path is represented by $$Kb1(\lambda)=(1-Tpa_{(c)}1(\lambda))\cdot Tsb_{(d)}1(\lambda)$$

In addition, letting $Tpa_{(c)}2(\lambda)$ be the transmittance of the polarizing beam splitter 8c for the P-polarized light of the second light ray L2, and $Tsb_{(d)}2l(\lambda)$ be the transmittance of the polarizing beam splitter 8d for the S-polarized light of the second light ray L2, analysis performance $Kb2(\lambda)$ with respect to the second light ray L2 on each of the polarization split films of the polarizing beam splitters 8c and 8d on the blue light path is represented by $$Kb2(\lambda)=(1-Tpa_{(c)}2(\lambda))\cdot Tsb_{(d)}2(\lambda)$$

In this case, a light shielding characteristic value $L_B$ on the red light path is expressed by $$L_B = \int_{430\,nm}^{490\,nm} \{Kb1(\lambda)+Kb2(\lambda)\}\times Y(\lambda)d\lambda \bigg/ 2\int_{430\,nm}^{490\,nm} Y(\lambda)d\lambda$$

According to FIGS. 7A to 7C, $$L_B=0.0023$$

Therefore, $$L_R, L_G, L_B < 0.006$$

The light shielding characteristic values $L_G$, $L_R$, and $L_B$ calculated on the green, red, and blue light paths satisfy conditions required to sufficiently reduce the amount of black leakage light that is not modulated by the reflection liquid crystal display elements and project images with good contrast.

In this embodiment, the color separation system (ranging from the light source to the image display elements) has been mainly described. However, the same applies to the color synthesis system (ranging from the image display elements to the projection optical system) because the light reflected by each image display element propagates through the same optical path in the reverse direction to that in the color separation system.

Third Embodiment

Figure 8:
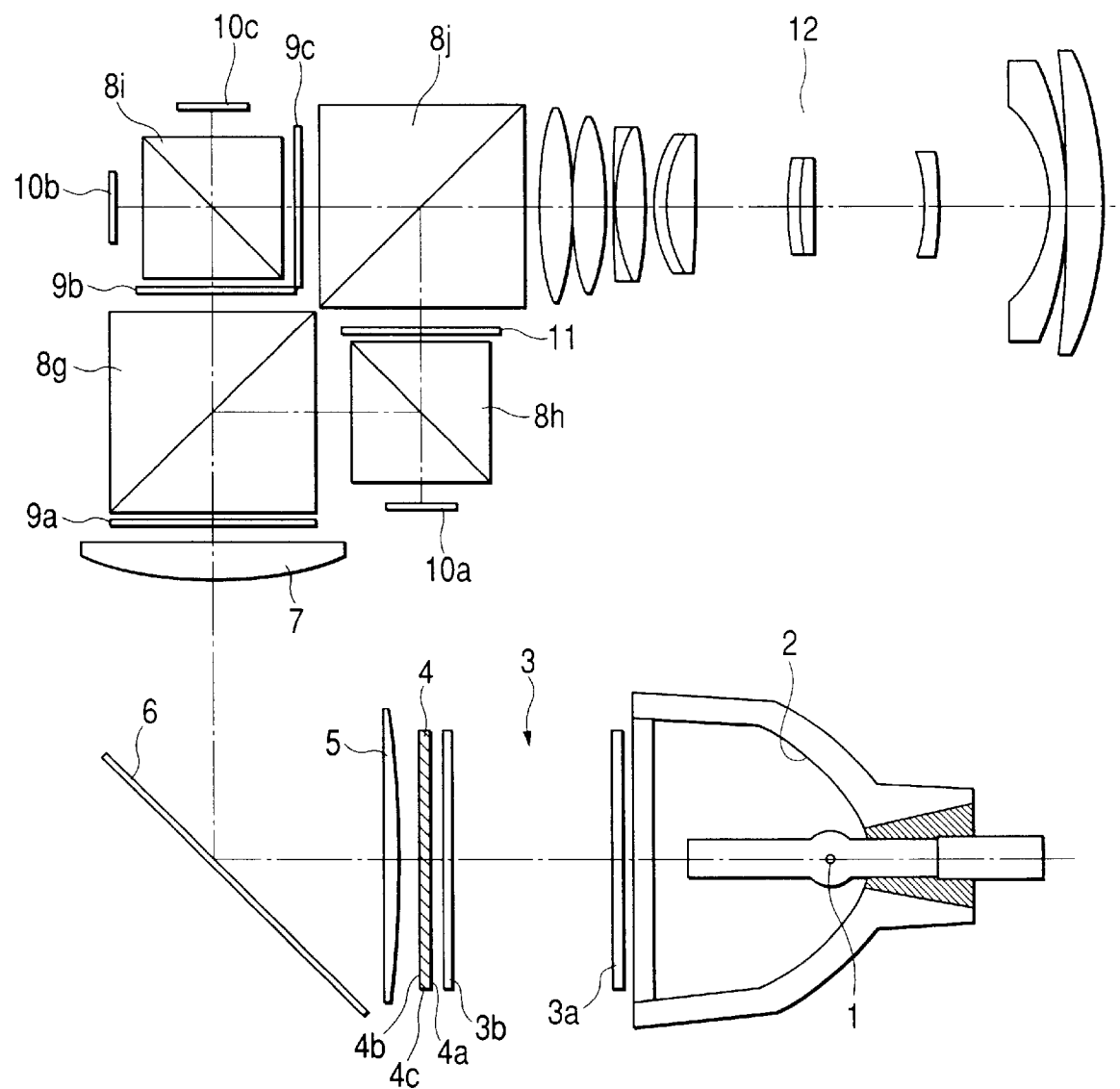
FIG. 8 is a view showing the optical arrangement of a projection image display apparatus according to the third embodiment of the present invention.

FIG. 8 shows the optical arrangement of a projection image display apparatus according to the third embodiment of the present invention. Note that the same reference numerals as in the first embodiment denote the same parts in the third embodiment.

In this embodiment, the characteristics of the polarization split films of the polarizing beam splitters used in the first and second embodiments are changed. Note that a fly-eye lens system and focusing optical system are the same as those described in the second embodiment, and the optical function of color separation and synthesis of light emerging from the field lens system 7 is the same as that in the first embodiment.

In this embodiment, as in the second embodiment, an incident angle α+ of a first light ray L1 on the polarization split film is (45+5.1)°, and an incident angle α− of a second light ray L2 on the polarization split film is (45−5.1)°.

Figure 9A:
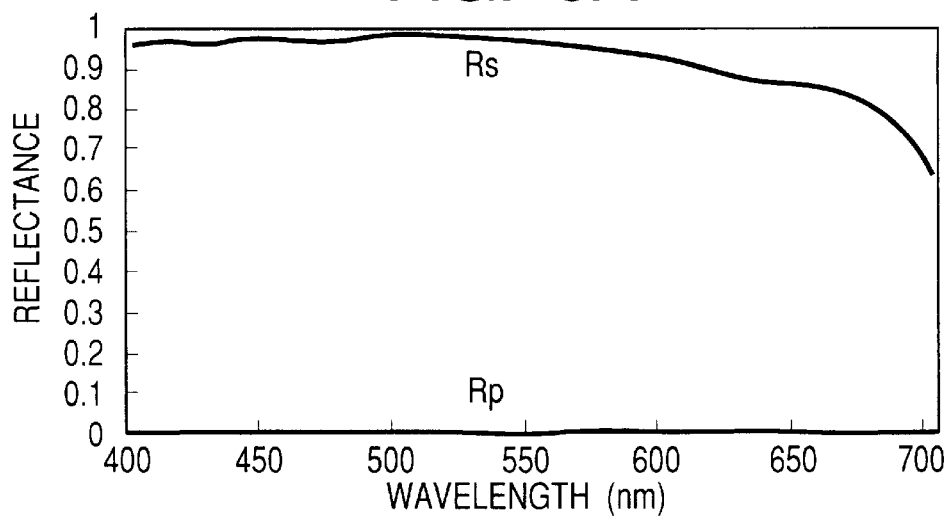
FIGS. 9A, 9B and 9C are graphs showing the reflectance characteristics of polarizing beam splitters in the projection image display apparatus according to the third embodiment.
Figure 9B:
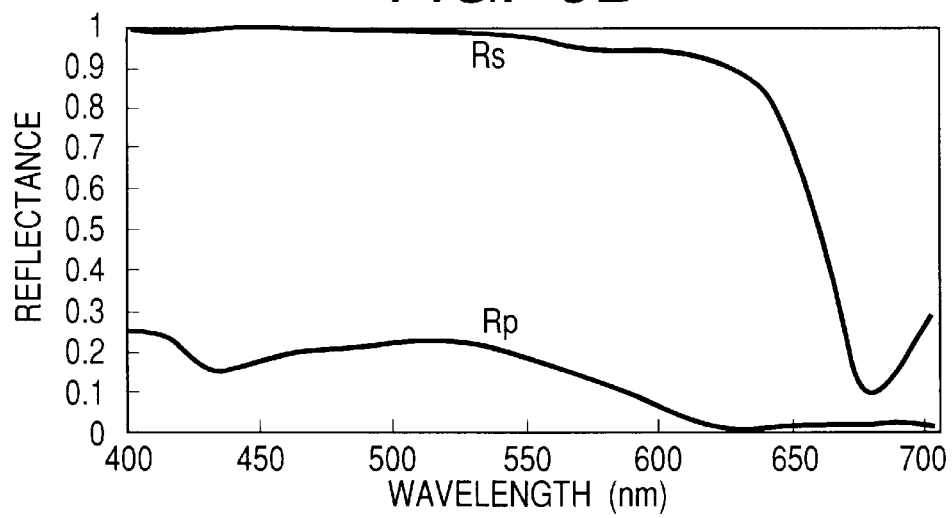
Figure 9C:
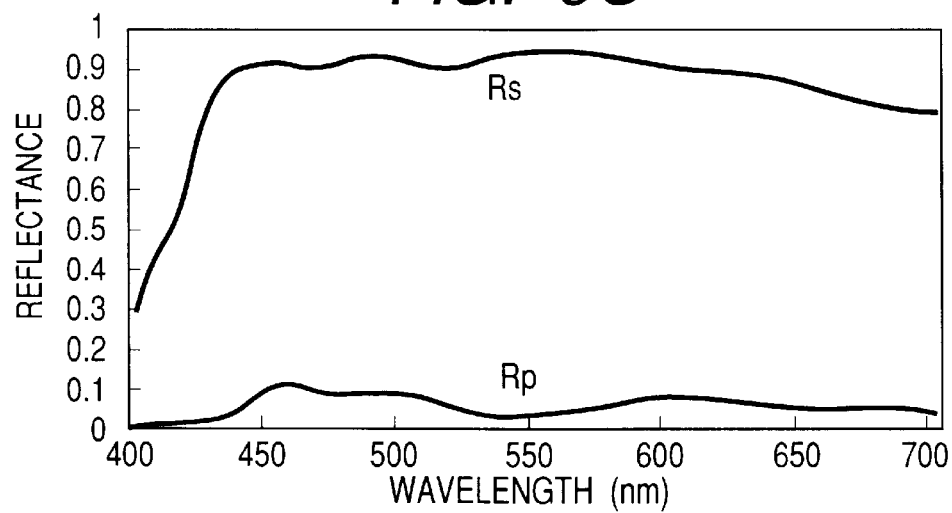

FIGS. 9A to 9C show the reflectance characteristics of the polarization split films of polarizing beam splitters 8g, 8h, 8i, and 8j in FIG. 8 with respect to light rays with incident angles of 45°, 50.1° (the incident angle of the first light ray L1), and 39.9° (the incident angle of the second light ray L2). Referring to FIGS. 9A to 9C, Rs represents the reflectance of S-polarized light; and Rp, the reflectance of P-polarized light.

Each of the polarization split films of the polarizing beam splitters 8g, 8h, 8i, and 8j is formed by alternately stacking a total of 19 high reflectance layers (H) (e.g., $Y_2O_3$) and low reflectance layers (L) (e.g., $MgF_2$).

Table 6 shows constans representing the refractive index variances of the respective layers of each of the polarization split films of the polarizing beam splitters 8g, 8h, 8j, and 8j and the thicknesses of the respective layers.

TABLE 6

| Number of Layer(s) | Material for Layer | Thickness (nm) | a | b | c |
|---|---|---|---|---|---|
| 1 | H (high) | 87 | 1.693 | 228.8 | 16.9 |
| 2 | L (low) | 94 | 1.375 | 110 | 3 |
| 3 | H | 57 | 1.693 | 228.8 | 16.9 |
| 4 | L | 137 | 1.375 | 110 | 3 |
| 5 | H | 87 | 1.693 | 228.8 | 16.9 |
| 6 | L | 140 | 1.375 | 110 | 3 |
| 7 | H | 74 | 1.693 | 228.8 | 16.9 |
| 8 | L | 128 | 1.375 | 110 | 3 |
| 9 | H | 76 | 1.693 | 228.8 | 16.9 |
| 10 | L | 143 | 1.375 | 110 | 3 |
| 11 | H | 98 | 1.693 | 228.8 | 16.9 |
| 12 | L | 155 | 1.375 | 110 | 3 |
| 13 | H | 117 | 1.693 | 228.8 | 16.9 |
| 14 | L | 157 | 1.375 | 110 | 3 |
| 15 | H | 109 | 1.693 | 228.8 | 16.9 |
| 16 | L | 157 | 1.375 | 110 | 3 |
| 17 | H | 118 | 1.693 | 228.8 | 16.9 |
| 18 | L | 186 | 1.375 | 110 | 3 |
| 19 | H | 117 | 1.693 | 228.8 | 16.9 |

In this embodiment, letting $Tsa_{(h)}1(\lambda)$ be the transmittance of the polarizing beam splitter 8h for the S-polarized light of the first light ray L1, and $Tpb_{(j)}1(\lambda)$ be the transmittance of the polarizing beam splitter 8j for the P-polarized light of the first light ray L1, analysis performance $Kr1(\lambda)$ with respect to the first light ray L1 on each of the polarization split films of the polarizing beam splitters 8h and 8j on the red light path is represented by $$Kr1(\lambda)=Tsa_{(h)}1(\lambda)\cdot(1-Tpb_{(j)}1(\lambda))$$

In addition, letting $Tsa_{(h)}2(\lambda)$ be the transmittance of the polarizing beam splitter 8h for the S-polarized light of the second light ray L2, and $Tpb_{(j)}2(\lambda)$ be the transmittance of the polarizing beam splitter 8j for the P-polarized light of the second light ray L2, analysis performance $Kr2(\lambda)$ with respect to the second light ray L2 on each of the polarization split films of the polarizing beam splitters 8h and 8j on the red light path is represented by $$Kr2(\lambda)=Tsa_{(h)}2(\lambda)\cdot(1-Tpb_{(j)}2(\lambda))$$

In this case, a light shielding characteristic value $L_R$ on the red light path is expressed by $$L_R = \int_{590nm}^{650nm}\{Kr1(\lambda)+Kr2(\lambda)\}\times Y(\lambda)d\lambda \bigg/ 2\int_{590nm}^{650nm} Y(\lambda)d\lambda$$

According to FIGS. 9A to 9C, $L_R$=0.0051

Letting $Tsa_{(i)}1(\lambda)$ be the transmittance of the polarizing beam splitter 8i for the S-polarized light of the first light ray L1, and $Tsb_{(j)}1(\lambda)$ be the transmittance of the polarizing beam splitter 8j for the S-polarized light of the first light ray L1, analysis performance $Kg1(\lambda)$ with respect to the first light ray L1 on each of the polarization split films of the polarizing beam splitters 8i and 8-j on the green light path is represented by $$Kg1(\lambda)=Tsa_{(i)}1(\lambda)\cdot Tsb_{(j)}1(\lambda)$$

In addition, letting $Tsa_{(i)}2(\lambda)$ be the transmittance of the polarizing beam splitter 8i for the S-polarized light of the second light ray L2, and $Tsb_{(j)}2(\lambda)$ be the transmittance of the polarizing beam splitter 8j for the S-polarized light of the second light ray L2, analysis performance $Kg2(\lambda)$ with respect to the second light ray L2 on each of the polarization split films of the polarizing beam splitters 8i and 8j on the green light path is represented by $$Kg2(\lambda)=Tsa_{(i)}2(\lambda)\cdot Tsb_{(j)}2(\lambda)$$

In this case, a light shielding characteristic value $L_G$ on the green light path is expressed by $$L_G = \int_{500nm}^{580nm}\{Kg1(\lambda)+Kg2(\lambda)\}\times Y(\lambda)d\lambda \bigg/ 2\int_{500nm}^{580nm} Y(\lambda)d\lambda$$

According to FIGS. 9A to 9C, $L_G$=0.0025

Letting $Tpa_{(i)}1(\lambda)$ be the transmittance of the polarizing beam splitter 8i for the P-polarized light of the first light ray L1, and $Tsb_{(j)}1(\lambda)$ be the transmittance of the polarizing beam splitter 8j for the S-polarized light of the first light ray L1, analysis performance $Kb1(\lambda)$ with respect to the first light ray L1 on each of the polarization split films of the polarizing beam splitters 8i and 8j on the blue light path is represented by $$Kb1(\lambda)=(1-Tpa_{(i)}1(\lambda))\cdot Tsb_{(j)}1(\lambda)$$

In addition, letting $Tpa_{(i)}2(\lambda)$ be the transmittance of the polarizing beam splitter 8i for the P-polarized light of the second light ray L2, and $Tsb_{(j)}2(\lambda)$ be the transmittance of the polarizing beam splitter 8j for the S-polarized light of the second light ray L2, analysis performance $Kb2(\lambda)$ with respect to the second light ray L2 on each of the polarization split films of the polarizing beam splitters 8i and 8j on the blue light path is represented by $$Kb2(\lambda)=(1-Tpa_{(i)}2(\lambda))\cdot Tsb_{(j)}2(\lambda)$$

In this case, a light shielding characteristic value $L_B$ on the green light path is expressed by $$L_B = \int_{430nm}^{490nm} \{Kb1(\lambda) + Kb2(\lambda)\} \times Y(\lambda)\,d\lambda \bigg/ 2\int_{430nm}^{490nm} Y(\lambda)\,d\lambda$$

According to FIGS. 9A to 9C, $L_B = 0.0058$

Therefore, $L_R, L_G, L_B < 0.006$

The light shielding characteristic values $L_G$, $L_R$, and $L_B$ calculated on the green, red, and blue light paths satisfy conditions required to sufficiently reduce the amount of black leakage light that is not modulated by the reflection liquid crystal display elements and project images with good contrast.

In this embodiment, the color separation system (ranging from the light source to the image display elements) has been mainly described. However, the same applies to the color synthesis system (ranging from the image display elements to the projection optical system) because the light reflected by each image display element propagates through the same optical path in the reverse direction to that in the color separation system.

Fourth Embodiment

Figure 10:
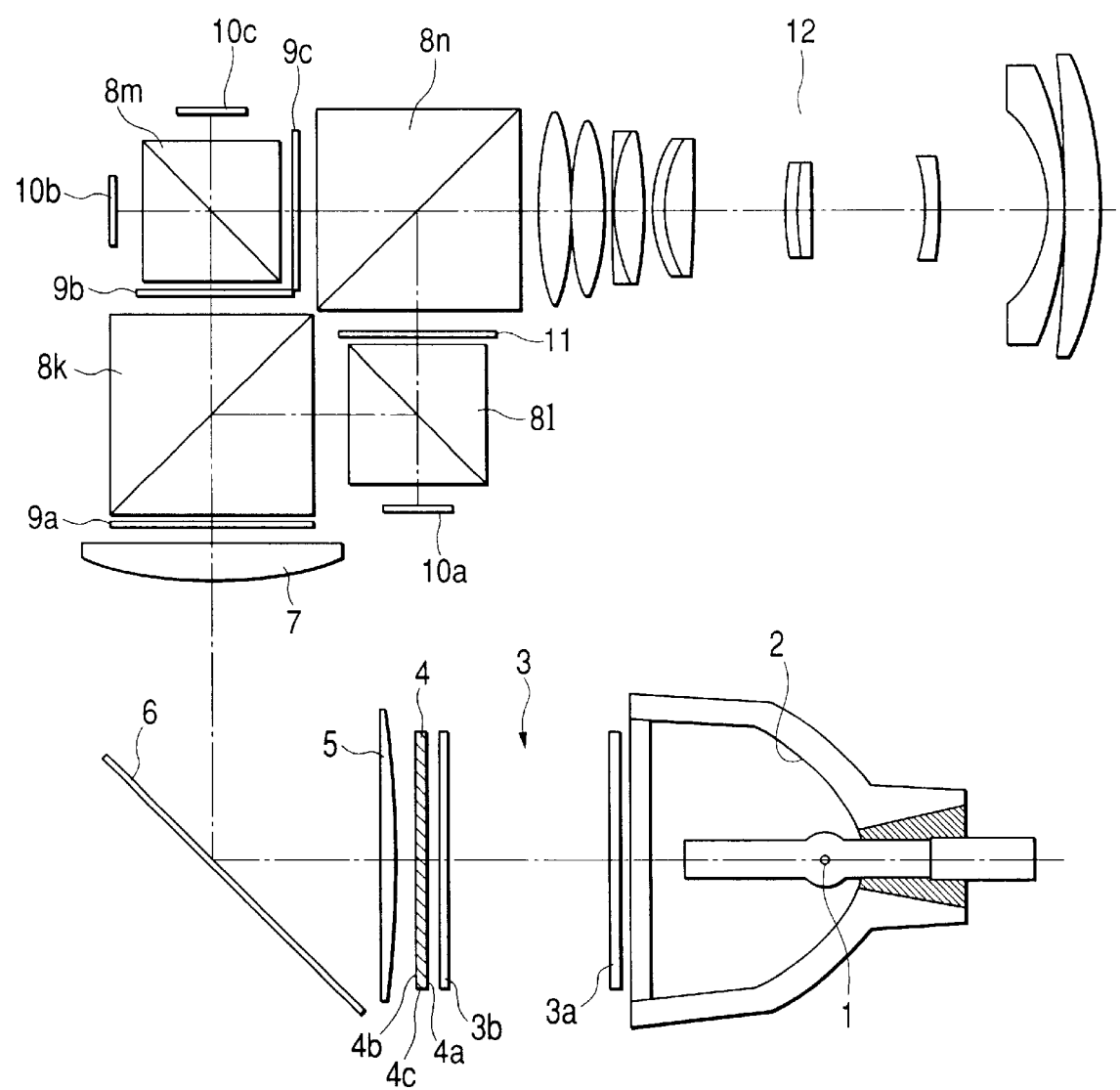
FIG. 10 is a view showing the optical arrangement of a projection image display apparatus according to the fourth embodiment of the present invention.

FIG. 10 shows the optical arrangement of a projection image display apparatus according to the fourth embodiment of the present invention. Note that the same reference numerals as in the first embodiment denote the same parts in the fourth embodiment.

In this embodiment, a polarizing beam splitter 81 which has polarization split performance improved only in the red wavelength region and is formed from glass having refractive index nd=1.74 is used as a polarizing beam splitter for analyzing only single color light (light in the red wavelength region) of R, G, and B light components.

Note that the focal length of a condenser lens system 5 is adjusted to correct the imaging position deviation caused at the reflection liquid crystal display element when the glass of the polarizing beam splitter is changed.

Table 7 shows the lens data of the focusing optical system shown in FIG. 10.

TABLE 7

| Plane | r | d | n |
|---|---|---|---|
| 1 | 122.6 | 3.5 | 1.516 |
| 2 | ∞ | 81.7 | |
| 3 | 43.4 | 3.7 | 1.516 |
| 4 | ∞ | | |

In Table 7, planes 1 and 2 indicate the condenser lens system 5; and planes 3 and 4, a field lens 7.

According to Table 7, the composite focal length f of the focusing optical system is given by $f = 83.8$ mm and the effective region width $\Phi$ of the condenser lens 5 in the polarizing surface tilting direction is given by $\Phi = 42.0$ mm The incident angle $\omega$ on the reflection liquid crystal display element is obtained from the relationship between the composite focal length f, the effective region width $\Phi$ of the condenser lens 5 in the polarizing surface tilting direction, and the incident angle $\omega$ as follows:

$\omega = 14.0°$

In addition, as shown in FIG. 3, the incident angle $\omega$ of light incident on a glass surface 8e1 of a polarizing beam splitter 8e is 14.0°. Therefore, according to Smell laws of refraction, an angle of refraction $\beta$ on the glass surface 8e1 of the polarizing beam splitter 8e is given by $\beta = 8.0°$ The upper and lower light rays in FIG. 3 which are refracted at an angle of 8.0° by the glass surface 8e1 of the polarizing beam splitter 8e are incident on a polarization split film 13a. The incident angle of a light ray Lc on the polarization split film 13a becomes a larger angle <y+=(45+8.0)°>, and the incident angle of a light ray Ld becomes a smaller angle <y−=(45−8.0)°>.

The light transmitted through the polarizing beam splitter 8e is refracted by a glass surface 8f1 of a polarizing beam splitter 8f and incident on a polarization split film 13b.

At this time, the incident angle of the light ray Lc on the polarization split film 13b is the smaller angle <y−=(45−8.0)°>, and the incident angle of the light ray Ld is the larger angle <y+=(45+8.0)°>.

The light rays Lc and Ld transmitted through the polarizing beam splitter 8f are incident on a reflection liquid crystal display element 10 at an angle of 14.0°.

A first light ray (upper light ray) L1 and second light ray (lower light ray) L2 in FIG. 3 are respectively light rays which have incident angles corresponding to 55% of the maximum angle $\beta$ of the light rays Lc and Ld incident on the polarizing beam splitters 8e and 8f with respect to an optical axis Lo. An incident angle $\alpha+$ of the first light ray L1 on the polarization split film 13a is (45+4.4)°, and an incident angle $\alpha-$ of the second light ray L2 on the polarization split film 13a is (45−4.4)°.

Figure 11A:
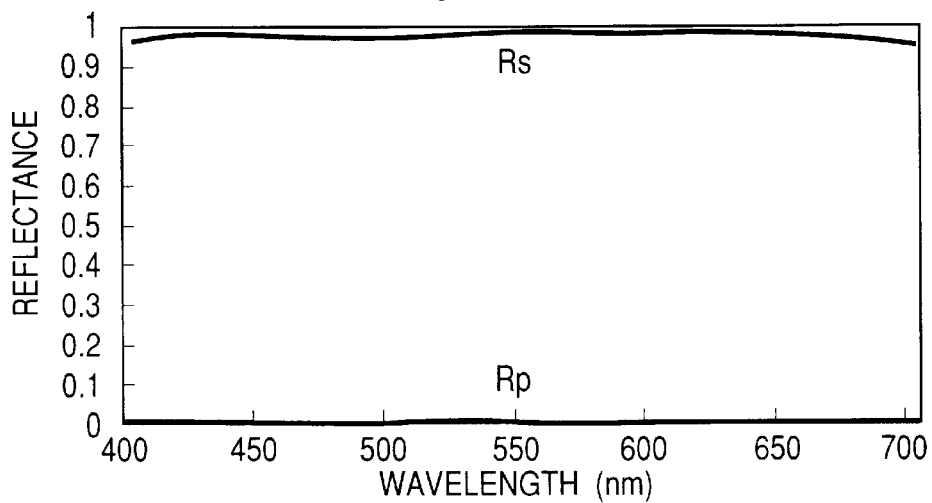
FIGS. 11A, 11B and 11C are graphs showing the reflectance characteristics of polarizing beam splitters in the projection image display apparatus according to the fourth embodiment.
Figure 11B:
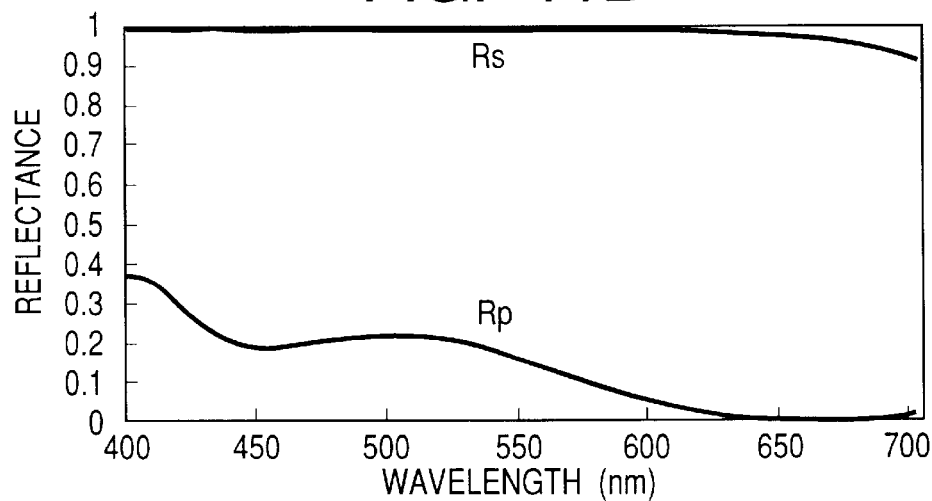
Figure 11C:
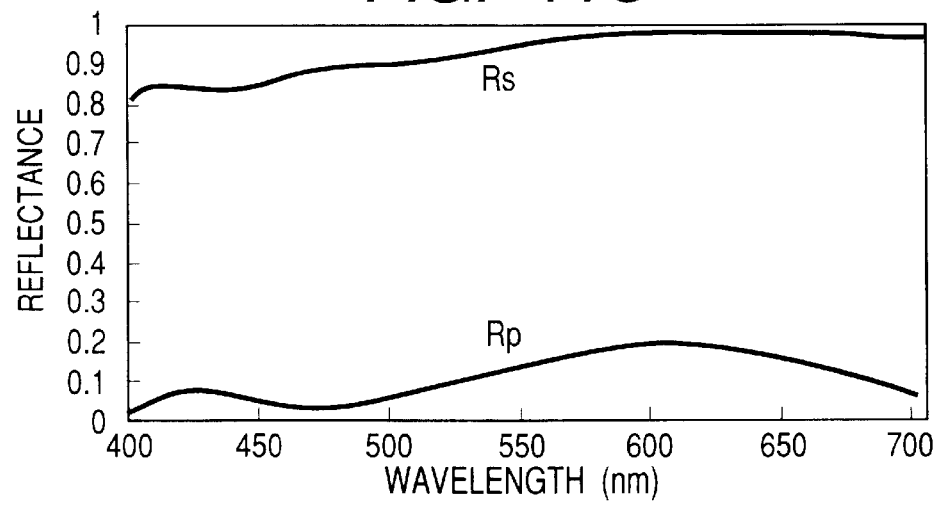
Figure 12A:
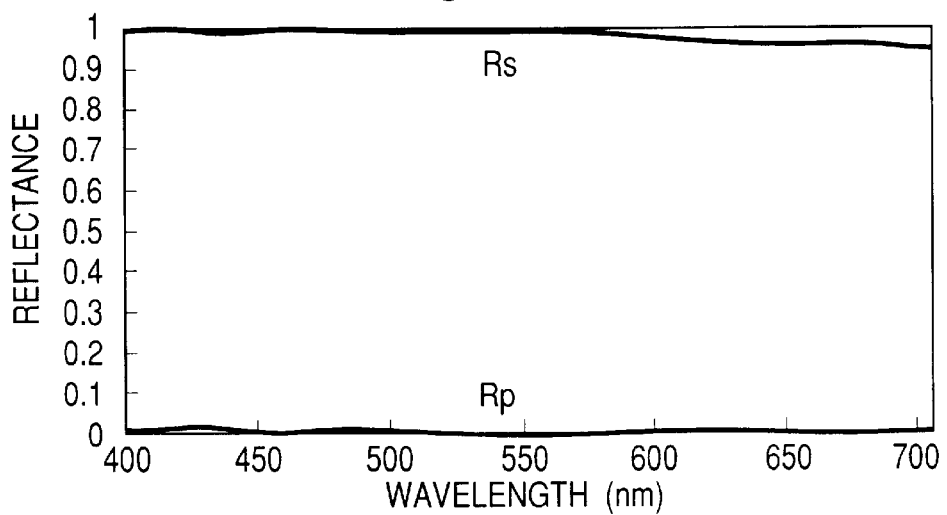
FIGS. 12A, 12B and 12C are graphs showing the reflectance characteristics of polarizing beam splitters in the projection image display apparatus according to the fourth embodiment.
Figure 12B:
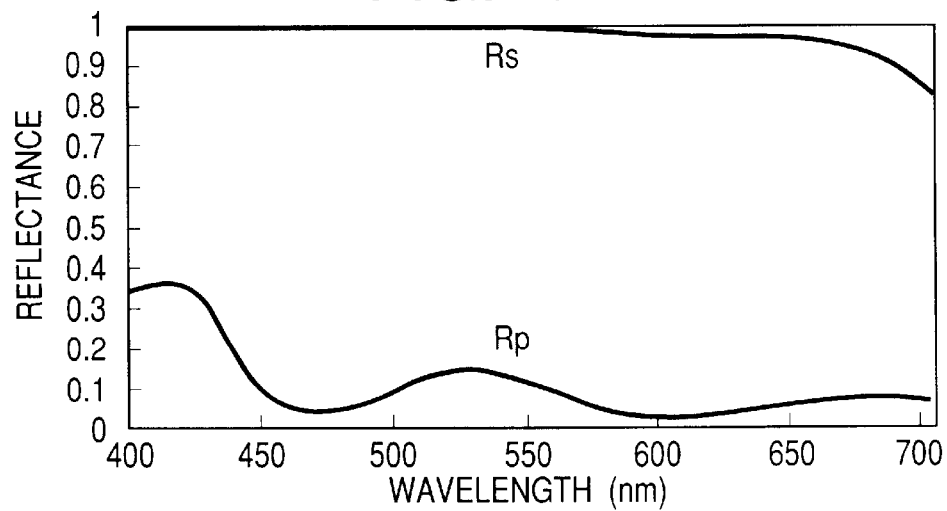
Figure 12C:
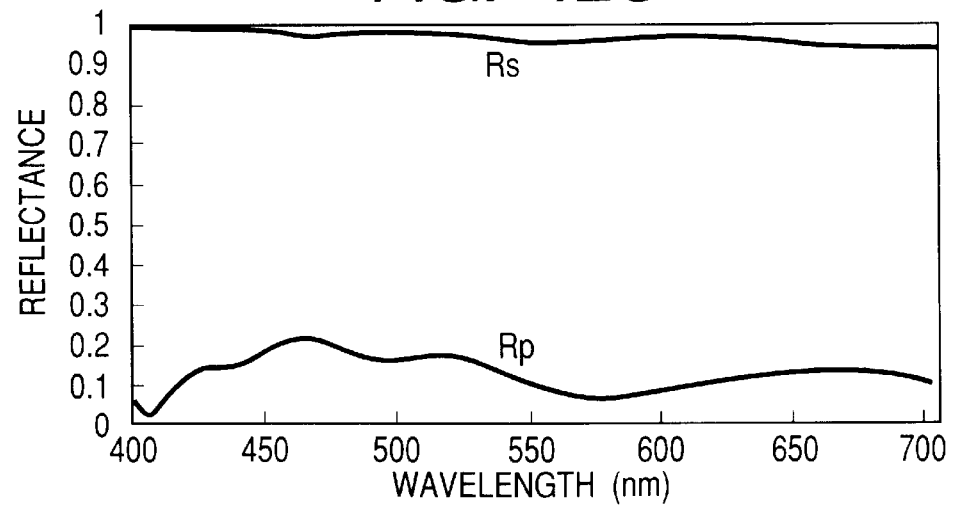

FIGS. 11A to 11C show the reflectance characteristics of the polarization split film of the polarizing beam splitter 81 in FIG. 10 with respect to light rays with incident angles of 45°, 49.4° (the incident angle of the first light ray L1), and 40.6° (the incident angle of the second light ray L2). FIGS. 12A to 12C show the reflectance characteristics of the polarization split films of the polarizing beam splitters 8k, 8m, and 8n in FIG. 10 with respect to light rays with incident angles of 45°, 49.4° (the incident angle of the first light ray L1), and 40.6° (the incident angle of the second light ray L2). Referring to FIGS. 11A to 11C and 12A to 12C, Rs represents the reflectance of S-polarized light; and Rp, the reflectance of P-polarized light.

The polarization split film of a polarizing beam splitter 8k has polarization split performance improved only in the red wavelength region and is formed by alternately stacking a total of eight high reflectance layers (H) (e.g., $Y_2O_3$) and low reflectance layers (L) (e.g., $MgF_2$).

Table 8 shows constants representing the refractive index variances of the respective layers of the polarization split film of the polarizing beam splittter 8l and the thicknesses of the respective layers.

TABLE 8

| Number of Layer(s) | Material for Layer | Thickness (nm) | a | b | c |
|---|---|---|---|---|---|
| 1 | H | 77 | 2.157 | 251.9 | 58.33 |
| 2 | L | 197 | 1.45 | 130 | 5 |
| 3 | H | 67 | 2.157 | 251.9 | 58.33 |
| 4 | L | 137 | 1.45 | 130 | 5 |
| 5 | H | 67 | 2.157 | 251.9 | 58.33 |
| 6 | L | 137 | 1.45 | 130 | 5 |
| 7 | H | 123 | 2.157 | 251.9 | 58.33 |
| 8 | L | 132 | 1.45 | 130 | 5 |

In addition, each of polarization split films of the polarizing beam splitters 8l, 8m, and 8n is formed by alternately stacking a total of 14 high reflectance layers (H) (e.g., $TiO_2$) and low reflectance layers (L) (e.g., $SiO_2$). Table 9 shows constants representing the refractive index variances of the respective layers of each of the respective polarization split films of the polarizing beam splitters 8l, 8m, and 8n and the thicknesses of the respective layers.

TABLE 9

| Number of Layer(s) | Material for Layer | Thickness (nm) | a | b | c |
|---|---|---|---|---|---|
| 1 | H | 126 | 2.157 | 251.9 | 58.33 |
| 2 | L | 73 | 1.45 | 130 | 5 |
| 3 | H | 134 | 2.157 | 251.9 | 58.33 |
| 4 | L | 106 | 1.45 | 130 | 5 |
| 5 | H | 116 | 2.157 | 251.9 | 58.33 |
| 6 | L | 176 | 1.45 | 130 | 5 |
| 7 | H | 40 | 2.157 | 251.9 | 58.33 |
| 8 | L | 190 | 1.45 | 130 | 5 |
| 9 | H | 42 | 2.157 | 251.9 | 58.33 |
| 10 | L | 181 | 1.45 | 130 | 5 |
| 11 | H | 54 | 2.157 | 251.9 | 58.33 |
| 12 | L | 80 | 1.45 | 130 | 5 |
| 13 | H | 45 | 2.157 | 251.9 | 58.33 |
| 14 | L | 127 | 1.45 | 130 | 5 |

Letting $Tsa_{(l)}1(\lambda)$ be the transmittance of the polarizing beam splitter 8l for the S-polarized light of the first light ray L1, and $Tpb_{(n)}1(\lambda)$ be the transmittance of the polarizing beam splitter 8n for the P-polarized light of the first light ray L1, analisis performance $Kr1(\lambda)$ with respect to the first light ray L1 on each of the polarization split films of the polarizing beam splitters 8l and 8n on the red light path is represented by $$Kr1(\lambda)=Tsa_{(l)}1(\lambda) \cdot (1-Tpb_{(n)}1(\lambda))$$

In addition, letting $Tsa_{(l)}2(\lambda)$ be the transmittance of the polarizing beam splitter 8l for the S-polarized light of the second light ray L2, and $Tpb_{(n)}2(\lambda)$ be the transmittance of the polarizing beam splitter 8n for the P-polarized light of the second light ray L2, analysis performance $Kr2(\lambda)$ with respect to the second light ray L2 on each of the polarization split films of the polarizing beam splitters 8l and 8n on the red light path is represented by $$Kr2(\lambda)=Tsa_{(l)}2(\lambda) \cdot (1-Tpb_{(n)}2(\lambda))$$

In this case, a light shielding characteristic value $L_R$ on the red light path is expressed by $$L_R = \int_{590nm}^{650nm} \{Kr1(\lambda) + Kr2(\lambda)\} \times Y(\lambda) d\lambda \bigg/ 2\int_{590nm}^{650nm} Y(\lambda) d\lambda$$

According to FIGS. 11A to 11C and 12A to 12C, $$L_R=0.00082$$

Letting $Tsa_{(m)}1(\lambda)$ be the transmittance of the polarizing beam splitter 8m for the S-polarized light of the first light ray L1, and $Tsb_{(n)}1(\lambda)$ be the transmittance of the polarizing beam splitter 8n for the S-polarized light of the first light ray L1, analysis performance $Kg1(\lambda)$ with respect to the first light ray L1 on each of the polarization split films of the polarizing beam splitters 8m and 8n on the green light path is represented by $$Kg1(\lambda)=Tsa_{(m)}1(\lambda) \cdot Tsb_{(n)}1(\lambda)$$

In addition, letting $Tsa_{(m)}2(\lambda)$ be the transmittance of the polarizing beam splitter 8m for the S-polarized light of the second light ray L2, and $Tsb_{(n)}2(\lambda)$ be the transmittance of the polarizing beam splitter 8n for the P-polarized light of the second light ray L2, analysis performance $Kg2(\lambda)$ with respect to the second light ray L2 on each of the polarization split films of the polarizing beam splitters 8m and 8n on the green light path is represented by $$Kg2(\lambda)=Tsa_{(m)}2(\lambda) \cdot Tsb_{(n)}2(\lambda)$$

In this case, a light shielding characteristic value $L_G$ on the green light path is expressed by $$L_G = \int_{500nm}^{580nm} \{Kg1(\lambda) + Kg2(\lambda)\} \times Y(\lambda) d\lambda \bigg/ 2\int_{500nm}^{580nm} Y(\lambda) d\lambda$$

According to FIGS. 11A to 11C and 12A to 12C, $$L_G=0.00022$$

Letting $Tpa_{(m)}1(\lambda)$ be the transmittance of the polarizing beam splitter 8m for the P-polarized light of the first light ray L1, and $Tsb_{(n)}1(\lambda)$ be the transmittance of the polarizing beam splitter 8n for the S-polarized light of the first light ray L1, analysis performance $Kb1(\lambda)$ with respect to the first light ray L1 on each of the polarization split films of the polarizing beam splitters 8m and 8n on the blue light path is represented by $$Kb1(\lambda)=(1-Tpa_{(m)}1(\lambda)) \cdot Tsb_{(n)}1(\lambda)$$

In addition, letting $Tpa_{(m)}2(\lambda)$ be the transmittance of the polarizing beam splitter 8m for the P-polarized light of the second light ray L2, and $Tsb_{(n)}2(\lambda)$ be the transmittance of the polarizing beam splitter 8n for the S-polarized light of the second light ray L2, analysis performance $Kb2(\lambda)$ with respect to the second light ray L2 on each of the polarization split films of the polarizing beam splitters 8m and 8n on the blue light path is represented by $$Kb2(\lambda)=(1-Tpa_{(m)}2(\lambda)) \cdot Tsb_{(n)}2(\lambda)$$

In this case, a light shielding characteristic value $L_B$ on the green light path is expressed by $$L_B = \int_{430nm}^{490nm} \{Kb1(\lambda) + Kb2(\lambda)\} \times Y(\lambda)\,d\lambda \Big/ 2\int_{430nm}^{490nm} Y(\lambda)\,d\lambda$$

According to FIGS. 11A to 11C and 12A to 12C, $L_B = 0.00064$

Therefore, $L_R, L_G, L_B < 0.002$

The light shielding characteristic values $L_R$, $L_G$, and $L_B$ calculated on the red, green, and blue light paths satisfy conditions required to project motion pictures and the like which include many dark images such as night scenes and demand high contrast.

The above embodiment has exemplified the case wherein the color separation means for separating light from the light source into light components in two wavelength regions is constituted by the polarizing beam splitter and color selective retardation plate. However, the color separation means may be formed by using a dichroic mirror.

In this embodiment, the color separation system (ranging from the light source to the image display elements) has been mainly described. However, the same applies to the color synthesis system (ranging from the image display elements to the projection optical system) because the light reflected by each image display element propagates through the same optical path in the reverse direction to that in the color separation system.

Fifth Embodiment

Figure 13A:
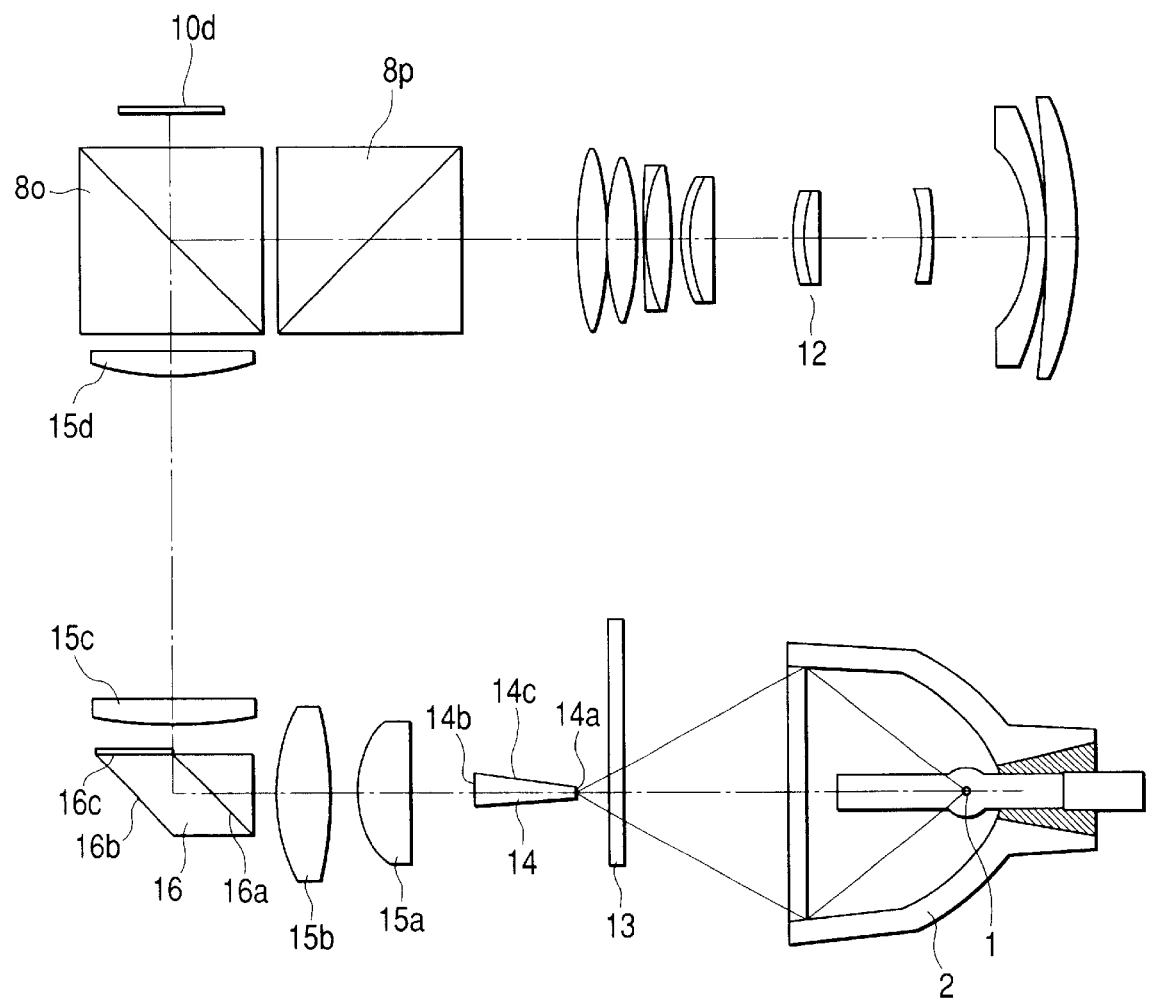
FIGS. 13A and 13B are views showing the optical arrangement of a projection image display apparatus according to the fifth embodiment of the present invention.

FIG. 13A shows the optical arrangement of a projection image display apparatus according to the fifth embodiment of the present invention. This embodiment is a projection image display apparatus using one reflection liquid crystal display element.

Referring to FIG. 13A, a light source 1 emits white light in a continuous spectrum. A reflector 2 focuses light in a predetermined direction. A color filter 13 transmits only light of a specific color of the focused light. A glass rod 14 has a rectangular opening portion.

This apparatus includes a first condenser lens 15a, second condenser lens 15b, condenser lens 15c, and field lens 15d'.

This apparatus also includes a polarization conversion element 16 for uniformly converting unpolarized light into predetermined polarized light, first and second polarizing beam splitters 8o and 8p each designed to transmit P-polarized light and reflect S-polarized light, a reflection liquid crystal display element 10d for reflecting and modulating light, and a projection lens system 12.

The optical function of this embodiment will be described next. The light emitted from the light source 1 is focused in a predetermined direction by the reflector 2. In this case, the reflector 2 has an elliptic shape. Light from a first focal position on this elliptic surface is focused at a second focal position on the elliptic surface. These focused light beams are incident from a rectangular opening 14a of the glass rod 14 and reflected by a side surface 14c of the glass rod 14. As a consequence, a plurality of divergent light beams emerge from the other rectangular opening 14b of the glass rod 14.

The light beams emerging from the glass rod 14 are focused by the first and second condenser lenses 15a and 15b to form a plurality of light source images. The polarization conversion element 16 is placed near the plurality of light source images.

The polarization conversion element 16 is constituted by a polarization split surface 16a, reflecting surface 16b, and $\lambda/2$ wavelength plate 16c. Light incident on the polarization split surface 16a is split into a P-polarized light component (polarized light component parallel to the drawing surface) that is transmitted and an S-polarized light component (polarized light component perpendicular to the drawing surface) that is reflected.

The transmitted P-polarized light component is reflected by the reflecting surface 16b and transmitted through the $\lambda/2$ wavelength plate 16c to be converted into the same polarized light component as the S-polarized light component and, emerges in the same direction as that of the S-polarized light component.

The light emerging from the polarization conversion element 16 is focused by a condenser lens 5c and field lens 5d. The focused light is incident as S-polarized light onto the first polarizing beam splitter 8o and reflected by the polarization split surface and reaches the reflection liquid crystal display element 10d.

Illumination light is modulated and reflected by the reflection liquid crystal display element 10d. The S-polarized light component of the modulated reflected light is reflected by the polarization split surface again to return to the light source side. As a consequence, this light component is removed from projection light. The P-polarized light component of the modulated reflected light is transmitted through the polarization split surface to become projection light.

The light transmitted through the first polarizing beam splitter 8o is incident as P-polarized light onto the second polarizing beam splitter 8p and transmitted through the polarization split surface to reach the projection lens system 12.

Figure 13B:
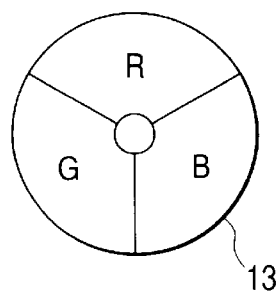

In this case, as shown in FIG. 13B, the color filter 13 is constituted by a combination of filters having different characteristics so as to switch colors (R, G, and B) to be transmitted. Colors to be transmitted are sequentially switched by rotating the color filter 13, and the reflection liquid crystal display element is controlled in synchronism with this switching of illumination light colors. This makes it possible to project a full-color image with one reflection liquid crystal display element.

In the first to fifth embodiments, all the polarizing beam splitters are designed to transmit P-polarized light and reflect S-polarized light. However, polarizing beam splitters designed to reflect P-polarized light and transmit S-polarized light may be used.

FIG. 14 shows a modification to the first embodiment. Similar modifications are also conceivable with respect the second, third, and fourth embodiments.

In addition, a polarization disturbance caused in a reflection image display apparatus may be adjusted by placing a $\lambda/4$ plate between the image display apparatus and the polarizing beam splitter and properly adjusting the $\lambda/4$ plate.

Although the embodiments of the present invention have exemplified the reflection image display elements, transmission image display elements may be used.

As has been described above, according to this embodiment, in the projection image display apparatus having two polarization split surfaces placed on the optical path from the image display element to the projection optical system, inequality (1) is satisfied by the light shielding characteristic value obtained by weighting the amounts of leakage light with the relative visibility of the human eye and integrating the resultant values with respect to the first and second light rays, of the light rays incident on the polarization split surface, whose angles with respect to the optical axis correspond to 55% of the maximum angle of the incident light rays with respect to the optical axis. This makes it possible to project and display images with high-contrast.

If the above light shielding characteristic value satisfies inequality (2), the amount of black leakage light can be further reduced, and images which include many dark images such as night scenes and demand high contrast can also be projected and displayed.

What is claimed is:

1. A projection image display apparatus comprising
    an illumination optical system which illuminates an image display element with light from a light source and
    a projection optical system which projects light from the image display element through two polarization split surfaces,
    wherein when an occurrence ratio of leakage light on one polarization split surface with respect to a light ray having a wavelength $\lambda$ is represented by analysis performance $K(\lambda)$, relative visibility of the human eye is represented by $Y(\lambda)$, and a wavelength region of light rays incident on said one polarization split surface is represented by a range of $\lambda_1$ to $\lambda_2$, a value M given by $$M = \int_{\lambda_1}^{\lambda_2} Y(\lambda)K(\lambda)d\lambda \bigg/ \int_{\lambda_1}^{\lambda_2} Y(\lambda)d\lambda$$

is set as a leakage light amount on the polarization split surface, light rays, of the light rays incident on the polarization split surface, of which angles with respect to an optical axis correspond to 55% of a maximum angle of the incident light rays with respect to the optical axis and which are incident on one of the two polarization split surfaces which is located on the image display element side at largest and smallest angles are set as first and second light rays, respectively, and $$L<0.006$$

is satisfied when a light shielding characteristic value L on the two polarization split surfaces is represented by $$L=[(M1)a\cdot(M1)b+(M2)a\cdot(M2)b]/2$$

where
    (M1)a is the amount of leakage light of the first light ray on the polarization split surface on the image display element side,
    (M2)a is the amount of leakage light of the second light ray on the polarization split surface on the image display element side,
    (M1)b is the amount of leakage light of the first light ray on the polarization split surface on the projection optical system side, and
    (M2)b is the amount of leakage light of the second light ray on the polarization split surface on the projection optical system side.

2. An apparatus according to claim 1, wherein the light shielding characteristic value L satisfies $$L<0.002.$$

3. An apparatus according to claim 1, wherein the image display element is a reflection image display element.

4. An apparatus according to claim 1, further comprising:
    first, second, and third reflection image display elements;
    a light beam splitting system which splits light from the light source into a plurality of light beams and substantially uniforms intensities of the light beams;
    a color separation system which separates light from said light beam splitting system into a first wavelength region light and second and third wavelength region lights;
    a first polarization split surface which guides the first wavelength region light from said color separation system to said first reflection image display element and analyzes light from said first reflection image display element;
    a first color selective retardation plate which changes a polarization direction of only the second wavelength region light of the second and third wavelength region light from said color separation system;
    a second polarization split surface which splits the second and third wavelength region light from said first color selective retardation plate, which have polarization directions perpendicular to each other to guide the lights to said second and third reflection image display elements, respectively, synthesizes lights from said second and third reflection image display elements, and analyzes lights from said second and third reflection image display elements;
    a second color selective retardation plate which changes a polarization direction of only one of the second and third wavelength region lights from said second polarization split surface; and
    a third polarization split surface which synthesizes the second and third wavelength region lights from said second color selective retardation plate and the first wavelength region light from said first polarization split surface, guides the light components to said projection optical system, and analyzes light components from said first, second, and third reflection image display elements.

5. An apparatus according to claim 1, wherein
    said apparatus comprises first, second, and third reflection image display elements, and
    said illumination optical system splits light from the light source into first, second, and third wavelength region lights, and guides the lights to said first, second, and third reflection image display elements, respectively.

6. An apparatus according to claim 5, wherein
    light reflected by one of said first, second, and third reflection image display elements is reflected by the polarization split surface located on the reflection image display element side, is transmitted through the polarization split surface located on the projection optical system side, and reaches said projection optical system,
    analysis performance $Ka(\lambda)$ of the polarization split surface on the reflection image display element side is represented by $$Ka(\lambda)=1-Tpa(\lambda)$$

where $Tpa(\lambda)$ is a transmittance of P-polarized light through the polarization split surface on the reflection image display element side, analysis performance $Kb(\lambda)$ of the polarization split surface on the projection optical system side is represented by $$Kb(\lambda)=Tsb(\lambda)$$

where $Tsb(\lambda)$ is a transmittance of S-polarized light through the polarization split surface on the projection optical system side, and analysis performance $K(\lambda)$ of the two polarization split surfaces is represented by $$K(\lambda) = Ka(\lambda) \cdot Kb(\lambda)$$
$$= (1 - Tpa(\lambda)) \cdot Tsb(\lambda).$$

7. An apparatus according to claim 5, wherein
light transmitted through the polarization split surface on one of the first, second, and third reflection image display element sides is reflected by the polarization split surface on the projection optical system side and reaches said projection optical system,
analysis performance $Ka(\lambda)$ of the polarization split surface is represented by $$Ka(\lambda)=Tsa(\lambda)$$

where $Tsa(\lambda)$ is a transmittance of S-polarized light through the polarization split surface on the reflection image display element side,
analysis performance $Kb(\lambda)$ of the polarization split surface is represented by $$Kb(\lambda)=1-Tpb(\lambda)$$

where $Tpb(\lambda)$ is a transmittance of P-polarized light through the polarization split surface on the projection optical system side, and
analysis performance $K(\lambda)$ of the two polarization split surfaces is represented by $$K(\lambda) = Ka(\lambda) \cdot Kb(\lambda)$$
$$= Tsa(\lambda) \cdot (1 - Tpb(\lambda)).$$

8. An apparatus according to claim 5, wherein
light transmitted through the polarization split surface on one of the first, second, and third reflection image display element sides is transmitted through the polarization split surface on the projection optical system side and reaches said projection optical system,
analysis performance $Ka(\lambda)$ of the polarization split surface is represented by $$Ka(\lambda)=Tsa(\lambda)$$

where $Tsa(\lambda)$ is a transmittance of S-polarized light through the polarization split surface on the reflection image display element side,
analysis performance $Kb(\lambda)$ of the polarization split surface is represented by $$Kb(\lambda)=Tsb(\lambda)$$

where $Tsb(\lambda)$ is a transmittance of S-polarized light through the polarization split surface on the projection optical system side, and analysis performance $K(\lambda)$ of the two polarization split surfaces is represented by $$K(\lambda) = Ka(\lambda) \cdot Kb(\lambda)$$
$$= Tsa(\lambda) \cdot Tsb(\lambda).$$

9. An apparatus according to claim 5, wherein
light reflected by the polarization split surface on one of the first, second, and third reflection image display element sides is reflected by the polarization split surface on the projection optical system side and reaches said projection optical system,
analysis performance $Ka(\lambda)$ of the polarization split surface is represented by $$Ka(\lambda)=1-Tpa(\lambda)$$

where $Tpa(\lambda)$ is a transmittance of P-polarized light through the polarization split surface on the reflection image display element side,
analysis performance $Kb(\lambda)$ of the polarization split surface is represented by $$K2(\lambda)=1-Tpb(\lambda)$$

where $Tpb(\lambda)$ is a transmittance of P-polarized light through the polarization split surface on the projection optical system side, and
analysis performance $K(\lambda)$ of the two polarization split surfaces is represented by $$K(\lambda) = Ka(\lambda) \cdot Kb(\lambda)$$
$$= (1 - Tpa(\lambda)) \cdot (1 - Tpb(\lambda)).$$

10. An apparatus according to claim 5, wherein each of the first, second, and third wavelength region light components corresponds to one of red, green, and blue light components.

11. An apparatus according to claim 1, wherein the image display element is a reflection liquid crystal display element.

12. An apparatus according to claim 1, further comprising three polarizing beam splitters and one dichroic prism.

13. An apparatus according to claim 1, further comprising three polarizing beam splitters and one dichroic mirror.

14. A projection display apparatus comprising:
a light source;
a first, second and third reflection image display elements;
a color separation system which separates light from said light source into a light of first wavelength region and a light of second and third wavelength regions;
a first polarization split surface which guides light of the first wavelength region from said color separation system to said first reflection image display element and analyzes light from said first reflection image display element;
a first color selective retardation plate which changes a polarization direction of light of said second wavelength region of light of said second and third wavelength regions from said color separation system;
a second polarization split surface which splits light of said second and third wavelength regions from said first color selective retardation plate into light of said second wavelength region and light of said third wavelength region, guides light of said second wavelength region to said second reflection image display element, guides light at said third wavelength region to said third reflection image display element, synthesizes lights from said second and third reflection image display elements, and analyzes lights from said second and third reflection image display elements;

a second color selective retardation plate which changes a polarization direction of light of one of lights of said second and third wavelength regions from said second polarization split surface;

a third polarization split surface which synthesizes lights of said second and third wavelength regions from said second color selective retardation plate and light of said first wavelength region from said first polarization split surface and analyzes light of said second and third wavelength regions from said second color selective retardation plate and light of said first wavelength region from said first polarization split surface; and a projection optical system which projects lights of said first, second and third wavelength region from said third polarization split surface onto a projection surface, wherein when an occurrence ration of leakage light on one polarization split surface with respect to a light ray having a wavelength $\lambda$ is represented by analysis performance $K(\lambda)$, relative visibility of human eye is represented by $Y(\lambda)$, and a wavelength region of light rays incident on said one polarization split surface is represented by a range of $\lambda_1$ to $\lambda_2$, a value of M given by $$M = Y(\lambda)K(\lambda)d\lambda/Y(\lambda)d\lambda$$

is set as a leakage light amount on the said one of polarization split surface, and of light rays incident on said first, second and third polarization split surfaces, of which angle with respect to an optical axis correspond to 55% of a maximum angle of the incident light rays with respect to the optical axis, light rays incident on said first polarization split surface at largest angle and smallest angle are respectively set as a $1a$ light ray and a $2a$ light ray, and light rays incident on said second polarization split surface at largest angle and smallest angle are respectively set as a $1b$ light ray and a $2b$ light ray, $$LB < 0.006$$

is satisfied when a light shielding characteristic value L13 on said first and third polarization split surfaces is represented by $$L13 = [(M1)a \times (M1)c1 + (M2)a \times (M2)c1]/2$$

and $L23 < 0.006$ is satisfied when a light shielding characteristic value L23 on said second and third polarization split surfaces is represented by $$L23[M1)b \times (M1)c2 + (M2)b \times (M2)c2]/2$$

where (M1)a is the amount of leakage light of said $1a$ light ray on said first polarization split surface, (M2)a is the amount of leakage light of said $2a$ light ray on said first polarization split surface, (M1)b is the amount of leakage light of said $1b$ light ray on said second polarization split surface, (M2)b is the amount of leakage light of said $2b$ light ray on said second polarization split surface, (M1)c1 is the amount of leakage light of said $1a$ light ray on said third polarization split surface, (M2)c1 is the amount of leakage light of said $2a$ light ray on said third polarization split surface.

(M1)c2 is the amount of leakage light of said $1b$ light ray on said third polarization split surface, and (M2)c2 is the amount of leakage light of said $2b$ light ray on said third polarization split surface.

15. An apparatus according to claim 14, wherein light reflected by one of said first, second and third reflection image display elements is reflected by said first polarization split surface, is transmitted through said third polarization split surface, and reaches said projection optical system, analysis performance $Ka(\lambda)$ of said first polarization split surface is represented by $$Ka(\lambda) = 1 - Tpa(\lambda)$$

where $Tpa(\lambda)$ is a transmittance of P-polarized light transmitting through said first polarization split surface, analysis performance $Kb(\lambda)$ of said third polarization split surface is represented by $Kb(\lambda) = Tsb(\lambda)$ where $Tsb(\lambda)$ is a transmittance of S-polarized light transmitting through said third polarization split surface, and analysis performance of $K(\lambda)$ of said first and third polarization split surfaces is represented by $$K(\lambda) = Ka(\lambda) \times Kb(\lambda) = (1 - Tpa(\lambda)) \times Tsb(\lambda).$$

16. An apparatus according to claim 14, wherein light reflected by one of said first, second and third reflection image display elements is reflected by said second polarization split surface, is transmitted through said third polarization split surface, and reaches said projection optical system, analysis performance $Ka(\lambda)$ of said second polarization split surface is represented by $$Ka(\lambda) = 1 - Tpa(\lambda)$$

where $Tpa(\lambda)$ is a transmittance of P-polarized light transmitting through said second polarization split surface, analysis is performance $Kb(\lambda)$ of said third polarization split surface is represented by $Kb(\lambda) = Tsb(\lambda)$ where $Tsb(\lambda)$ is a transmittance of S-polarized light transmitting through said third polarization split surface, and analysis performance of $K(\lambda)$ of said second and third polarization split surfaces is represented by $$K(\lambda) = Ka(\lambda) \times Kb(\lambda) = (1 - Tpa(\lambda)) \times Tsb(\lambda).$$

17. An apparatus according to claim 14, wherein light reflected by one of said first, second and third reflection image display elements is transmitted through said first polarization split surface, is reflected by said third polarization split surface, and reaches said projection optical system, analysis performance Ka($\lambda$) of said first polarization split surface is represented by $Ka(\lambda)=Tsa(\lambda)$ where Tsa($\lambda$) is a transmittance of S-polarized light transmitting through said first polarization split surface, analysis performance Kb($\lambda$) of said third polarization split surface is represented by $Kb(\lambda)=1-tpb(\lambda)$ where Tpb($\lambda$) is a transmittance of P-polarized light transmitting through said third polarization split surface, and analysis performance of K($\lambda$) of said first and third polarization split surfaces is represented by $K(\lambda)=Ka(\lambda) \times Kb(\lambda)=Tsa(\lambda) \times (1-tpb(\lambda))$.

18. An apparatus according to claim 14, wherein light reflected by one of said first, second and third reflection image display elements is transmitted through said second polarization split surface, is reflected by said third polarization split surface, and reaches said projection optical system, analysis performance Ka($\lambda$) of said second polarization split surface is represented by $Ka(\lambda)=Tsa(\lambda)$ where Tsa($\lambda$) is a transmittance of S-polarized light transmitting through said second polarization split surface, analysis performance Kb($\lambda$) of said third polarization split surface is represented by $Kb(\lambda)=1-Tpb(\lambda)$ where Tpb($\lambda$) is a transmittance of P-polarized light transmitting through said third polarization split surface, and analysis performance of K($\lambda$) of said second and third polarization split surfaces is represented by $K(\lambda)=Ka(\lambda) \times Kb(\lambda)=Tsa(\lambda) \times (1-Tpb(\lambda))$.

19. An apparatus according to claim 14, wherein light reflected by one of said first, second and third reflection image display elements is transmitted through said first polarization split surface, is transmitted through said third polarization split surface, and reaches said projection optical system, analysis performance Ka($\lambda$) of said first polarization split surface is represented by $Ka(\lambda)=Tsa(\lambda)$ where Tsa($\lambda$) is a transmittance of S-polarized light transmitting through said first polarization split surface, analysis performance Kb($\lambda$) of said third polarization split surface is represented by $Kb(\lambda)=Tsb(\lambda)$ where Tsb($\lambda$) is a transmittance of S-polarized light transmitting through said third polarization split surface, and analysis performance of K($\lambda$) of said first and third polarization split surfaces is represented by $K(\lambda)=Ka(\lambda) \times Kb(\lambda)=Tsa(\lambda) \times Tsb(\lambda)$.

20. An apparatus according to claim 14, wherein light reflected by one of said first, second and third reflection image display elements is transmitted through said second polarization split surface, is transmitted through said third polarization split surface, and reaches said projection optical system, analysis performance Ka($\lambda$) of said second polarization split surface is represented by $Ka(\lambda)=Tsa(\lambda)$ where Tsa($\lambda$) is a transmittance of S-polarized light transmitting through said second polarization on split surface, analysis performance Kb($\lambda$) of said third polarization split surface is represented by $Kb(\lambda)=Tsb(\lambda)$ where Tsb($\lambda$) is a transmittance of S-polarized light transmitting through said third polarization split surface, and analysis performance of K($\lambda$) of said second and third polarization split surfaces is represented by $K(\lambda)=Ka(\lambda) \times Kb(\lambda)=Tsa(\lambda \times Tsb(\lambda)$.

21. An apparatus according to claim 14, wherein light reflected by one of said first, second and third reflection image display element is reflected by said first polarization split surface, is reflected by said third polarization split surface, and reaches said projection optical system, analysis performance Ka($\lambda$) of said first polarization split surface is represented by $Ka(\lambda)=1-Tpa(\lambda)$ where Tpa($\lambda$) is a transmittance of P-polarized light transmitting through said first polarization split surface, analysis performance Kb($\lambda$) of said third polarization split surface is represented by $Kb(\lambda)=1-Tpb(\lambda)$ where Tpb($\lambda$) is a transmittance of P-polarized light transmitting through said third polarization split surface, and analysis performance of K($\lambda$) of said first and third polarization split surfaces is represented by $K(\lambda)=Ka(\lambda) \times Kb(\lambda)=(1-Tpa(\lambda)) \times (1-Tpb(\lambda))$.

22. An apparatus according to claim 14, wherein light reflected by one of said first second and third reflection image display elements is reflected by said second polarization split surface, is reflected by said third polarization split surface, and reaches said projection optical system, analysis performance Ka($\lambda$) of said second polarization split surface is represented by $Ka(\lambda)=1-Tpa(\lambda)$ where Tpa($\lambda$) is a transmittance of P-polarized light transmitting through said second polarization split surface, analysis performance Kb(λ) of said third polarization split surface is represented by $$Kb(\lambda)=1-Tpb(\lambda)$$

where Tpb(λ) is a transmittance of P-polarized light transmitting through said third polarization split surface, and analysis performance of K(λ) of said second and third polarization split surfaces is represented by $$K(\lambda)=Ka(\lambda)\times Kb(\lambda)=(1-Tpa(\lambda))\times(1-Tpb(\lambda)).$$

23. An apparatus according to claim 14, wherein said color separation system includes a dichroic prism.

24. An apparatus according to claim 14, wherein said color separation system includes a dichroic mirror.

25. An apparatus according to claim 14, wherein each of light components of said first, second, and third wavelength regions respectively corresponds to one of red, green and blue light components.

26. A projection image display apparatus comprising:
a light source;
a first, second and third reflection image display elements;
a first polarization beam splitter which includes a first polarization split surface for separating light from said light source into a light of first wavelength region and a light of second and third wavelength regions;
a second polarization beams splitter which includes a second polarization split surface for guiding light of the first wavelength region from said first polarization beam splitter to said first reflection image display element and analyzing light from said first reflection image display element;
a first color selective retardation plate which changes a polarization direction of light of said second wavelength region of light of said second and third wavelength regions from said first polarization beam splitter;
a third polarization beam splitter which includes a third polarization split surface for splitting light of said second and third wavelength regions from said first color selective retardation plate into light of said second wavelength region and light of said third wavelength region, guiding light of said second wavelength region to said second reflection image display element, guiding light of said third wavelength region to said third reflection image display element, synthesizing lights from said second and third reflection image display elements, and analyzing lights from said second and third reflection image display elements;
a second color selective retardation plate which changes a polarization direction of light of one of lights of said second and third wavelength regions from said third polarization beam splitter;
a fourth polarization beam splitter which includes a fourth polarization split surface for synthesizing lights of said second and third wavelength regions from said second color selective retardation plate and light of said first wavelength region from said second polarization beam splitter and analyzing lights of said second and third wavelength regions from said second color selective retardation plate and light of said first wavelength region from said second polarization beam splitter; and
a projection optical system which projects lights of said first, second and third wavelength regions from said fourth polarization beam splitter onto a projection surface, wherein when an occurrence ration of leakage light on one polarization split surface with respect to a light ray having a wavelength λ is represented by analysis performance K(λ), relative visibility of human eye is represented by Y(λ), and a wavelength region of light rays incident on said one polarization split surface is represented by a range of $\lambda_1$ and $\lambda_2$, a value M given by $M=Y(\lambda)K(\lambda)d\lambda/Y(\lambda)d\lambda$ is set as a leakage light amount on the said one of polarization split surface, and of light rays incident on said second, third and fourth polarization split surfaces, of which angle with respect to an optical axis correspond to 55% of a maximum angle of the incident light rays with respect to the optical axis, light rays incident on said second polarization split surface at largest angle and smallest angle are respectively set as a 1a light ray and a 2a light ray, and light rays incident on said third polarization split surface at largest angle and smallest angle are respectively set as 1b light ray and a 2b light ray, L24<0.006 is satisfied when a light shielding characteristic value L24 on said second and fourth polarization split surfaces is represented by $$L24=[(M1)a\times(M1)c1+(M2)a\times(M2)c1]/2$$

and L34<0.006 is satisfied when a light shielding characteristic value L34 on said third and fourth polarization split surfaces is represented by $$L34=[(M1)b\times(M1)c1+(M2)b\times(M2)c1]/2$$

where
(M1)a is the amount of leakage light of said 1a light ray on said second polarization split surface,
(M2)a is the amount of leakage light of said 2a light ray on said second polarization split surface,
(M1)b is the amount of leakage light of said 1b light ray on said third polarization split surface,
(M2)b is the amount of leakage light of said 2b light ray on said third polarization split surface,
(M2)c1 is the amount of leakage light of said 1a light ray on said fourth polarization split surface,
(M2)c1 is the amount of leakage light of said 2a light ray on said fourth polarization split surface,
(M1)c2 is the amount of leakage light of said 1b light ray on said fourth polarization split surface, and
(M2)c2 is the amount of said leakage light of said 2b light ray on said fourth polarization split surface.

27. An apparatus according to claim 26, wherein
light reflected by one of said first, second and third reflection image display elements is reflected by said second polarization split surface, is transmitted through said fourth polarization split surface, and reaches said projection optical system,
analysis performance Ka(λ) of said second polarization split surface is represented by $$Ka(\lambda)=1-Tpa(\lambda)$$

where Tpa(λ) is a transmittance of P-polarized light transmitting through said second polarization split surface, analysis performance Kb($\lambda$) of said fourth polarization surface is represented by $Kb(\lambda=Tsb(\lambda)$ where Tsb($\lambda$) is a transmittance of S-polarized light transmitting through said fourth polarization split surface, and analysis performance of K($\lambda$) of said second and fourth polarization split surface is represented by $$K(\lambda)=Ka(\lambda) \times kb(\lambda)=(1-Tpa(\lambda)) \times Tsb(\lambda).$$

28. An apparatus according to claim 26, wherein
light reflected by one of said first, second and third reflection image display elements is reflected by said third polarization split surface, is transmitted through said fourth polarization split surface, and reaches said projection optical system, analysis performance Ka($\lambda$) of said third polarization split surface is represented by $$Ka(\lambda)=1-Tpa(\lambda)$$

where Tpa($\lambda$) is a transmittance of P-polarized transmitting through said third polarization split surface, analysis performance Kb($\lambda$) of said fourth polarization split surface is represented by $Kb(\lambda)=Tsb(\lambda)$ where Tsb($\lambda$) is a transmittance of S-polarized light transmitting through said fourth polarization split surface, and analysis performance of K($\lambda$) of said third and fourth polarization split surfaces is represented by $$K(\lambda)=Ka(\lambda) \times Kb(\lambda)=(1-Tpa(\lambda)) \times Tsb(\lambda).$$

29. An apparatus according to claim 26, wherein
light reflected by one of said first, second and third reflection image display elements is transmitted through said second polarization split surface, is reflected by said fourth polarization split surface, and reaches said projection optical system, analysis performance Ka($\lambda$) of said second polarization split surface is represented by $Ka(\lambda)=Tsa(\lambda)$ where Tsa($\lambda$) is a transmittance of S-polarized light transmitting through said second polarization split surface, analysis performance Kb($\lambda$) of said fourth polarization split surface is represented by $$Kb(\lambda=1-Tpb(\lambda)$$

where Tpb($\lambda$) is a transmittance of P-polarized light transmitting through said fourth polarization split surface, and analysis performance of K($\lambda$) of said second and fourth polarization split surfaces is represented by $$K(\lambda)=Ka(\lambda) \times Kb(\lambda)=Tsa(\lambda) \times (1-Tpb(\lambda)).$$

30. An apparatus according to claim 26, wherein
light reflected by one of said first, second and third reflection image display elements is transmitted through said third polarization split surface, is reflected by said fourth polarization split surface, and reaches said projection optical system, analysis performance Ka($\lambda$) of said third polarization split surface is represented by $Ka(\lambda)=Tsa(\lambda)$ where Tsa($\lambda$) is a transmittance of S-polarized light transmitting through said third polarization split surface, analysis performance Kb($\lambda$) of said fourth polarization split surface is represented by $$Kb(\lambda)=1-Tpb(\lambda)$$

where Tpb($\lambda$) is a transmittance of P-polarized light transmitting through said fourth polarization split surface, and analysis performance of K($\lambda$) of said third and fourth polarization split surfaces is represented by $$K(\lambda)=Ka(\lambda) \times Kb(\lambda)=Tsa(\lambda) \times (1-Tpb(\lambda)).$$

31. An apparatus according to claim 26, wherein
light reflected by one of said first, second and third reflection image display elements is transmitted through said second polarization split surface, is transmitted through said fourth polarization split surface, and reaches said projection optical system, analysis performance Ka($\lambda$) of said second polarization split surface is represented by $Ka(\lambda)=Tsa(\lambda)$ where Tsa($\lambda$) is a transmittance of S-polarized light transmitting through said second polarization split surface, analysis performance Kb($\lambda$) of said fourth polarization split surface is represented by $$Kb(\lambda)=Tsb(\lambda)$$

where Tsb($\lambda$) is a transmittance of S-polarized light transmitting through said fourth polarization split surface, and analysis performance of K($\lambda$) of said second and fourth polarization split surfaces is represented by $$K(\lambda)=Ka(\lambda) \times Kb(\lambda)=Tsa(\lambda) \times Tsb(\lambda).$$

32. An apparatus according to claim 26, wherein
light reflected by one of said first, second and third reflection image display elements is transmitted through said third polarization split surface, is transmitted through said fourth polarization split surface, and reaches said projection optical system, analysis performance Ka($\lambda$) of said third polarization split surface is represented by $Ka(\lambda)=Tsa(\lambda)$ where Tsa($\lambda$) is a transmittance of S-polarized light transmitting through said third polarization split surface, analysis performance Kb($\lambda$) of said fourth polarization split surface is represented by $$Kb(\lambda)=Tsb(\lambda)$$

where Tsb($\lambda$) is a transmittance of S-polarized light transmitting through said fourth polarization split surface, and analysis performance of K($\lambda$) of said third and fourth polarization split surfaces is represented by $$K(\lambda)=Ka(\lambda) \times Kb(\lambda)=Tsa(\lambda) \times Tsb(\lambda).$$

33. An apparatus according to claim 26, wherein light reflected by one of said first, second and third reflection image display elements is reflected by said second polarization split surface, is reflected by said fourth polarization split surface, and reaches said projection optical system, analysis performance Ka($\lambda$) of said second polarization split surface is represented by $$Ka(\lambda)=1-Tpa(\lambda)$$

where Tpa($\lambda$) is a transmittance of P-polarized light transmitting through said second polarization split surface, analysis performance Kb($\lambda$) of said fourth polarization split surface is represented by $$Kb(\lambda)=1-Tpb(\lambda)$$

where Tpb($\lambda$) is a transmittance of P-polarized light transmitting through said fourth polarization split surface, and analysis performance of K($\lambda$) of said second and fourth polarization split surfaces is represented by $$K(\lambda)=Ka(\lambda)\times Kb(\lambda)=(1-Tpa(\lambda))\times(1-Tpb(\lambda)).$$

34. An apparatus according to claim 26, wherein light reflected by one of said first, second and third reflection image display elements is reflected by said third polarization split surface, is reflected by said fourth polarization split surface, and reaches said projection optical system, analysis performance Ka($\lambda$) of said third polarization split surface is represented by $$Ka(\lambda)=1-Tpa(\lambda)$$

where Tpa($\lambda$) is a transmittance of P-polarized light transmitting through said third polarization split surface, analysis performance Kb($\lambda$) of said fourth polarization split surface is represented by $$Kb(\lambda)=1-Tpb(\lambda)$$

where Tpb($\lambda$) is a transmittance of P-polarized light transmitting through said fourth polarization split surface, and analysis performance of K($\lambda$) of said third and fourth polarization split surfaces is represented by $$K(\lambda)=Ka(\lambda)\times Kb(\lambda)=(1-Tpa(\lambda))\times(1-Tpb(\lambda)).$$

35. An apparatus according to claim 26, wherein each of light components of said first, second and third wavelength regions respectively corresponds to one of red, green and blue light components.

* * * * *

UNITED STATES PATENT AND TRADEMARK OFFICE
CERTIFICATE OF CORRECTION

PATENT NO. : 6,831,706 B2
DATED : December 14, 2004
INVENTOR(S) : Masayuki Abe, Keiji Ohtaka and Atsushi Okuyama It is certified that error appears in the above-identified patent and that said Letters Patent is hereby corrected as shown below:

Column 9,
Line 13, delete "polarize d" and insert -- polarized --;

Column 10,
Line 33, delete "Smell" and insert -- Snell --;

Column 12,
Line 2, insert -- respect -- after "with";

Column 15,
Line 20, delete "Smell" and insert -- Snell --;

Column 19,
Line 16, delete "constans" and insert -- constants --;

Column 21,
Line 36, delete "81" and insert -- 8/ --;

Column 22,
Line 11, delete "Smell" and insert -- Snell --;
Line 66, delete "splittter" and insert -- splitter --;

Column 23,
Line 48, delete "analisis" and insert -- analysis --;

Column 31,
Line 3, delete "at" and insert -- of --;
Line 53, delete "L13" and insert -- LB --;

Column 32,
Line 58, delete the word "is";

Column 33,
Line 29, delete "*tpb*" and insert -- *Tbp* --;
Line 51, delete "I4" and insert -- 14 --;

Column 34,
Line 16, delete "on";
Line 31, delete "element" and insert -- elements --;

UNITED STATES PATENT AND TRADEMARK OFFICE
CERTIFICATE OF CORRECTION

PATENT NO. : 6,831,706 B2
DATED : December 14, 2004
INVENTOR(S) : Masayuki Abe, Keiji Ohtaka and Atsushi Okuyama It is certified that error appears in the above-identified patent and that said Letters Patent is hereby corrected as shown below:

Column 36,
Line 20, insert -- a -- after "set as";
Line 26, delete "$L24=$]" and insert --$L24=$[ --;

Column 37,
Line 2, insert -- split -- before the word "surface";
Line 7, delete "surface" and insert -- surfaces --;
Line 24, add the word -- light -- after "P-polarized".

Signed and Sealed this

Twenty-second Day of March, 2005

JON W. DUDAS
*Director of the United States Patent and Trademark Office*